(12) United States Patent
Liu et al.

(10) Patent No.: US 9,012,344 B2
(45) Date of Patent: Apr. 21, 2015

(54) ELECTROCATALYSTS USING POROUS POLYMERS AND METHOD OF PREPARATION

(75) Inventors: Di-Jia Liu, Naperville, IL (US); Shengwen Yuan, Chicago, IL (US); Gabriel A. Goenaga, Knoxville, TN (US)

(73) Assignee: UChicago Argonne, LLC, Chicago, IL (US)

( * ) Notice: Subject to any disclaimer, the term of this patent is extended or adjusted under 35 U.S.C. 154(b) by 195 days.

(21) Appl. No.: 13/106,696

(22) Filed: May 12, 2011

(65) Prior Publication Data

US 2011/0281719 A1 Nov. 17, 2011

Related U.S. Application Data

(60) Provisional application No. 61/334,543, filed on May 13, 2010.

(51) Int. Cl.

| | | |
|---|---|---|
| B01J 37/08 | (2006.01) | |
| B01J 31/06 | (2006.01) | |
| C08G 73/02 | (2006.01) | |
| C08G 83/00 | (2006.01) | |
| C08J 9/228 | (2006.01) | |
| B01J 31/18 | (2006.01) | |
| B01J 23/26 | (2006.01) | |
| B01J 23/30 | (2006.01) | |
| B01J 23/34 | (2006.01) | |
| B01J 23/70 | (2006.01) | |
| B01J 23/75 | (2006.01) | |
| B01J 35/10 | (2006.01) | |
| B01J 37/03 | (2006.01) | |
| H01M 4/88 | (2006.01) | |
| H01M 4/90 | (2006.01) | |

(52) U.S. Cl.
CPC .............. *B01J 31/1815* (2013.01); *B01J 23/26* (2013.01); *B01J 23/30* (2013.01); *B01J 23/34* (2013.01); *B01J 23/70* (2013.01); *B01J 23/75* (2013.01); *B01J 31/06* (2013.01); *B01J 35/1023* (2013.01); *B01J 35/1028* (2013.01); *B01J 37/031* (2013.01); *H01M 4/8885* (2013.01); *H01M 4/9008* (2013.01); *B01J 2531/025* (2013.01); *B01J 2531/842* (2013.01); *B01J 2531/845* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 7,550,223 B2 | 6/2009 | Zelenay et al. | |
| 2011/0294658 A1* | 12/2011 | Lefevre et al. | 502/185 |

FOREIGN PATENT DOCUMENTS

| | | | | |
|---|---|---|---|---|
| KR | 2003-0039381 | * | 5/2003 | D01F 9/45 |
| WO | WO 2010/051619 | * | 5/2010 | B01J 23/75 |

OTHER PUBLICATIONS

Xia et al. Macromolecules, 2010, 43, 3325-3330.*

(Continued)

*Primary Examiner* — Yun Qian
(74) *Attorney, Agent, or Firm* — Foley & Lardner LLP

(57) ABSTRACT

A method of producing an electrocatalyst article using porous polymers. The method creates a porous polymer designed to receive transition metal groups disposed at ligation sites and activating the transition metals to form an electrocatalyst which can be used in a fuel cell. Electrocatalysts prepared by this method are also provided. A fuel cell which includes the electrocatalyst is also provided.

5 Claims, 20 Drawing Sheets

(56) References Cited

OTHER PUBLICATIONS

Yuan, et al., *Nanoporous Polymers containing Sterocontorted Cores for Hydrogen Storage*, Macromolecules, 2009, pp. 1554-1559, American Chemical Society.

Jasinski, *A New Fuel Cell Cathode Catalyst*, Nature, Mar. 21, 1964, pp. 1212-1213, vol. 201, Nature Publishing Group.

Lefevre, et al., *Fe-Based Catalyst for the Reduction of Oxygen in Polymer Electrolyte Membrane Fuel Cell Conditions: Determination of the Amount of Peroxide Released During Electroreduction and its Influence on the Stability of the Catalysts*, Electrochimica Acta 48, 2003 2749-2760, Elsevier Science Ltd.

Faubert, et al., *Activation and Characterization of Fe-Based Catalysts for the Reduction of Oxygen in Polymer Electrolyte Fuel Cells*, Electrochimica Acta, 1998, vol. 43, Nos. 14-15, pp. 1969-1984, Elsevier Science, Ltd.

Lefevre, et al, *Iron-Based catalysts with Improved Oxygen Reduction Activity in Polymer Electrolyte Fuel Cells*, Science, Apr. 3, 2009, vol. 324, pp. 71-74, Science Magazine.

Wu, et al., *Polyaniline-Derived Non-Precious Catalyst for the Polymer Electrolyte Fuel Cell Cathode*, ECS Transactions, 2008, vol. 16(2), pp. 159-170.

Dong, et al., *Development of a T-Joint for Covalent Molecular Construction Based on 2,2'-bipyridine and Phenanthroline Isocyanide Metal Complexes*, Journal of Organometallic Chemistry, 2000, vol. 598, pp. 55-62. Elsevier Science S.A.

van Veen J.A.R. et al, "Oxygen Reduction on Monomeric Transition Metal Phthalocyanines in Acid Electrolyte," Electrochemica Acta, vol. 24, pp. 921-928, 1979, Pergamon Press Ltd., Printed in Great Britain.

\* cited by examiner

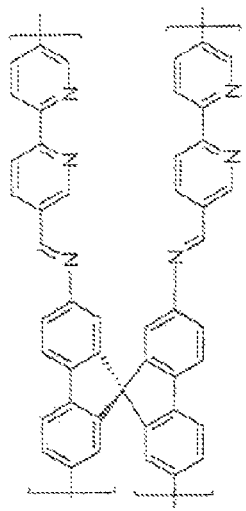
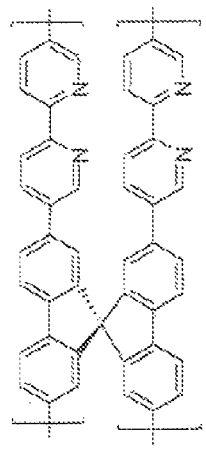
Poly-spirobifluorene-iminobipyridine or PSBPY-4
Poly-spirobifluorene-bypyridine or PSBPY-5
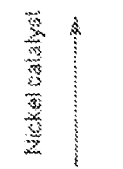
Dioxane/Acetic Acid →
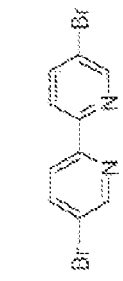
Nickel catalyst →
 +
EQ 1    FIG 3A
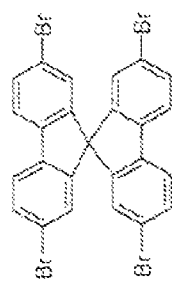 +
EQ 2    FIG 3B

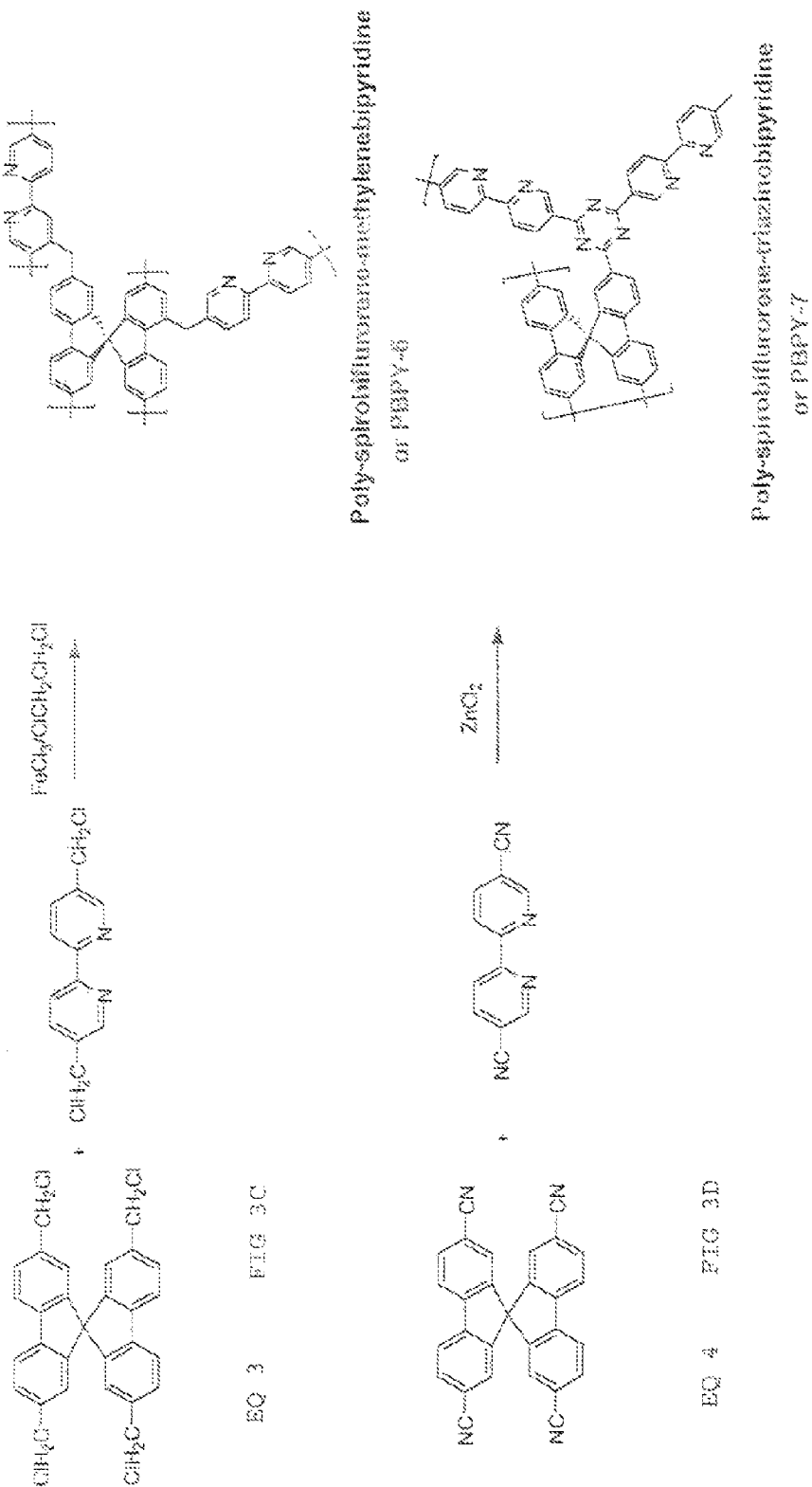

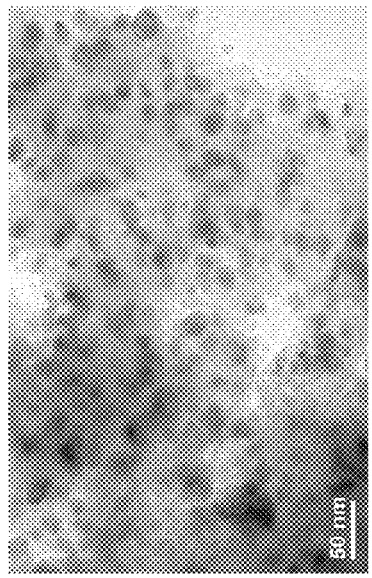
Fig. 12A(1)
T = 500 C
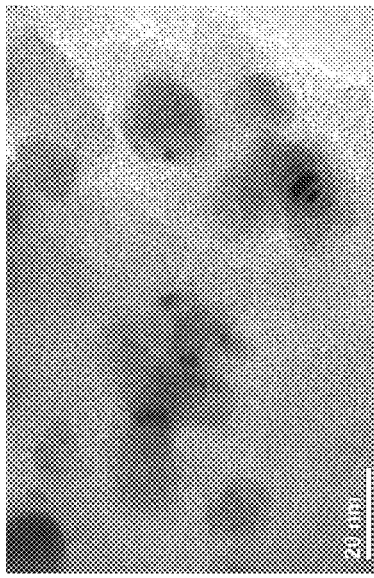
Fig. 12A(2)
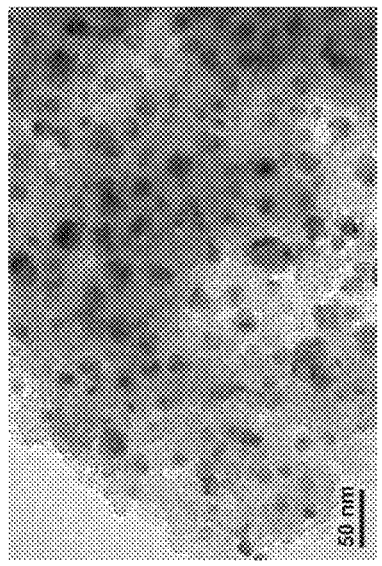
Fig. 12B(1)
T = 700 C
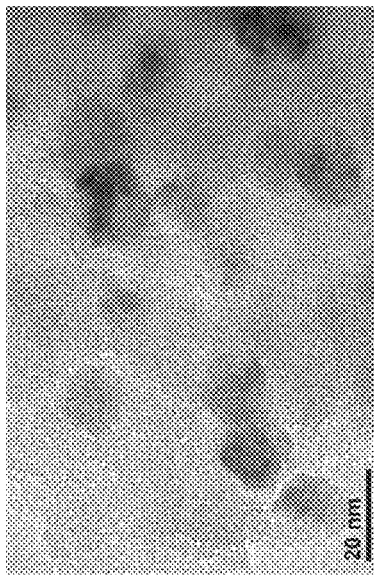
Fig. 12B(2)

Fe-Por-1, no heat-treatment, pyrolyzed at 600 °C, and 700 °C

Fe-Por-1, no heat-treatment, pyrolyzed at 600 °C, and 700 °C

ELECTROCATALYSTS USING POROUS POLYMERS AND METHOD OF PREPARATION

CROSS-REFERENCE TO RELATED PATENT APPLICATIONS

The present application claims priority to U.S. Provisional Patent Application No. 61/344,543, filed May 13, 2010. The contents of this application are incorporated herein by reference in their entirety.

STATEMENT OF GOVERNMENT INTEREST

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

FIELD OF THE INVENTION

The present invention relates generally to the field of electrocatalysts. More particularly the invention relates to non-Pt and non-precious metal electrocatalysts and methods of preparation. Preferred metals, such as transition metals, are incorporated into porous polymers which provide active ligation sites to interact with the transition metals.

BACKGROUND OF THE INVENTION

A fuel cell is an effective device that can convert chemical energy into electrical energy through electro-catalytic reactions. A proton exchange membrane fuel cell (hereinafter, "PEMFC".) operates at a relatively low temperature with a gas phase hydrogen provided as fuel and oxygen (air) as an oxidant. Due to its high conversion efficiency, low noise and low emissions, PEMFC has high potential for many uses in automobile applications and distributed power generation.

At the core of a PEMFC is the membrane electrode assembly (hereinafter, "MEA") which includes an anode, a cathode and a polymer electrolyte layer in-between. At the surface of the anode, hydrogen is oxidized to a proton started through the electro-catalytic process,

$$H_2 \rightarrow 2H^+ + 2e^- \qquad (1)$$

The protons thus produced are transported to the cathode side through a proton conductive membrane. At the surface of the cathode, oxygen is electro-catalytically reduced and subsequently reacts with protons from the equation (1) to form water,

$$O_2 + 4e^- + 4H^+ \rightarrow 2H_2O \qquad (2)$$

The reaction (2) is also known as the oxygen reduction reaction (hereinafter referred to as "ORR"). The reactions (1) and (2) occur on the surface of the electrode catalysts. At present, the most effective catalysts for these reactions are made of platinum supported on amorphous carbon. A typical Pt loading on the MEA surface ranges from 0.2 mg/cm² to 0.4 mg/cm². Since platinum is a precious metal with limited supply, its usage adds a significant cost to a PEMFC system.

Consequently, there is a substantial need for replacement materials for the catalyst to reduce costs and insure adequate material supplies for wide scale use in fuel cells, as well as other applications. Few catalyst metals have been found to have a comparable catalytic efficiency as that of platinum for the ORR. Those catalysts found with similar catalytic activity usually belong to the precious group metals (hereinafter referred to as "PGM"), such as Pd, Rh, Ir, Ru and others, in addition to Pt. The PGMs generally are very costly due to limited reserves worldwide. As noted hereinbefore, the use of PGMs for an electrochemical device, such as fuel cells, will add significant cost to the system, therefore, creating major barriers for commercialization.

There have been many attempts to replace PGMs, mainly through use of the transition metal compounds. For example, it has been known that the molecules containing a macrocyclic structure with an iron or cobalt ion coordinated by nitrogen from the four surrounding pyrrolic rings have the catalytic activity to capture and to reduce molecular oxygen. It has been demonstrated that ORR catalytic activity can be further improved for such systems containing coordinated $FeN_4$ and $CoN_4$ macrocycles if they have been heat-treated. Examples of macro-molecular system containing $FeN_4$ and $CoN_4$ moieties include corresponding transitional metal phthalocyanine and porphyrin. Recent experiments have shown a similar method of making amorphous carbon based catalyst with good ORR activity by mixing macromolecules with $FeN_4$ group and carbonaceous material or synthetic carbon support, followed by high temperature treatment in the gas mixture of ammonia, hydrogen and argon. Alternative study also found that high temperature treatment of iron salt deposited on the carbon in the presence nitrogen precursor can also produce catalyst with very good ORR activity. The catalytic activity is attributed to the active site with a phenanthroline type structure where Fe ion is coordinated to four pyridinic nitrogens. It was also found that the catalyst thus produced decomposed in an acidic condition to release iron, and thus is unstable for the electro-catalytic reaction such as for inside a fuel cell cathode. Recently, an issued U.S. patent discussed a method of preparing non-PGM catalyst by incorporating transition metal to heteroatomic polymers in the polymer/carbon composite. In addition, this patent further discussed a method to improve the activity of polymer/carbon composite by heat-treating the composite at elevated temperature in the inert atmosphere of nitrogen. Nevertheless, none of these methods or articles of manufacture have resulted in an adequate solution to the above stated problem of replacement materials of reasonable cost and adequate supplies for large scale use in fuel cells, as well as other applications requiring such catalysts.

SUMMARY OF THE INVENTION

A new method and composition is provided for an electrode catalyst, preferably for an oxygen reduction reaction ("ORR"). The catalyst preferably includes transition metals, carbon and nitrogen, but free of precious group metals ("PGM"). The method of preparation involves multiple steps, including the synthesis of porous polymers with intrinsic porosity and high surface area, the polymers containing ligand groups as anchoring sites for transition metal; adding one or more transition metals through chemical doping to the anchoring site, optionally adding other nitrogen containing compounds into the porous polymers; calcining the prepared polymers to form carbonaceous materials at elevated temperatures in an inert atmosphere, optionally treating the calcined polymer materials at the elevated temperature in the presence of ammonia and optionally treating the calcined materials with acid.

One embodiment of the current invention includes preparing porous polymers as the precursors for a non-PGM catalyst. The method of synthesis of high surface area precursors include providing porous polymers containing functional groups that can serve as ligation sites to interact with the transition metals to be dispersed therein. The porous polymers are prepared through cross-linking of monomers with stereo-contorted core and nitrogen-containing, oxygen-containing, or sulfur-containing molecules. Generally, the monomers with stereo-contorted core are used to generate micropore, mesopore and high surface area whereas the monomers with N-, O- or S-containing functional groups are used to produce ligation sites for transition metal inside of the porous polymers. Such polymers have high surface areas and uniform pore size distribution and can be used as platform or substrate materials for preparing non-PGM catalysts through further processing.

Another embodiment includes incorporation of a transition metal uniformly throughout the porous polymer. The methods include adding and exchange of atomically dispersed transition metals into individual ligation site for preparing non-PGM catalysts through further processing. The preferred transition metals include Co, Fe, Ni, Cr, Cu, Mn, Ta and W. They can be in the form of soluble organometallic compounds or inorganic salts. One or more transition metals can also be used simultaneously during preparation.

Yet another embodiment includes optional impregnation of nitrogen-containing organic compounds into the porous polymers. The porous structure of the selected polymers makes it relative easy to entrap nitrogen-containing organic compounds through various physical and chemical means. The added nitrogen-containing organic compounds can assist the formation of catalytic sites during the heat-treatment process.

In a further embodiment, the porous polymer is activated by thermal treatment, such as pyrolysis in an inert or reducing atmosphere. Such treatment can lead to decomposition and reaction between different components inside the polymers to form catalytic active sites. Such an activation process will also improve the electronic conductivity which is important for best function of the electrode catalyst.

In another embodiment the porous polymer is further processed by thermally treating the porous polymers with post-treatment methods, including acid wash, ball milling and a second thermal treatment in inert gas or in the presence of ammonia. Such post-treatment methods can further enhance the activity. In one aspect, one method of preparing an electroactive material is provide which includes: preparing a porous polymer; adding a precursor consisting essentially of one or more transition metals to the porous polymer; and activating transition metals disposed in the porous polymer by thermal treatment. In some embodiments, the method includes addition of a N-containing compound to the porous polymer. In some embodiments, the method further includes the step of adding N-containing organic compounds during the step of adding the transition metal precursor to the porous polymer.

In some embodiments, preparing the porous polymer includes a cross-linking reaction. In some embodiments, the cross-linking reaction includes adding a catalytic agent comprising $FeCl_3$. In some embodiments, the cross-linking reaction includes adding a voltage bias to the monomer solution while preparing the porous polymer. In some embodiments, preparing the porous polymer includes cross-linking at least one organic monomer with a functional group selected from ethynyl, thiophenyl, amino, ketone, aldehyde and carboxylic anhydride. In some embodiments, preparing the porous polymer includes cross-linking organic monomers with a stereo-hindered group. In some embodiments, the monomer includes a N-coordination site for incorporating a transition metal.

In some embodiments, activating the transition metals includes calcining the porous polymer to form a carbonaceous material in an inert gas atmosphere. In some embodiments, the carbonaceous material is treated at an elevated temperature in the presence of N-containing compounds selected from ammonia, pyridine or acetonitrile. In some embodiments, activating the transition metal sites includes adding a metal complex selected from the group of $Co(hfac)_2$, $Fe(hfac)_2$ and $Ni(hfac)_2$ wherein hfac is hexafluoroacetylacetonate. In some embodiments, the transition metals are selected from the group of Co, Fe, Ni, Cr, Cu, Mn, Ta and W. In one aspect, the method includes post-treatment.

In one aspect, an electrocatalyst is provided which includes a porous polymer containing transitional metal ligation groups disposed in the porous polymer and at least one transition metal attached to the transition metal ligation group. In some embodiments, the electrocatalyst consists essentially of the porous polymer and at least one transition metal. In some embodiments, the transition metal is selected from the group of Co, Fe, Ni, Cr, Cu, Mn, Ta and W.

In some embodiments, the porous polymer includes a precursor consisting essentially of a product formed by a cross-linking reaction involving at least one monomer. In some embodiments, the porous polymer comprises a precursor consisting essentially of a product formed by a cross-linking reaction involving at least one of a first monomer and a second monomer. In some embodiments, the first monomer is selected from the group of a monomer containing N-coordinating sites for incorporating the transition metal. In some embodiments, the second monomer consists essentially of a monomer containing a stereo-contorted structure for producing porosity and increased surface area. In some embodiments, the stereo-contorted structure is selected from a structural element group of spirobifluorene, tetraphenylmethane, and triphenylamine substituted with different functional groups.

In some embodiments, the cross-linking reaction involving oxidative coupling of a first monomer of porphyrin with thiophenyl functional groups catalyzed by $FeCl_3$ or by constant voltage bias. In some embodiments, the cross-linking reaction involving trimerization of a first monomer containing ethynyl functional groups and a second monomer containing a stereo-contorted structure in Claim 7 catalyzed by a transition metal catalyst. In some embodiments, the cross-linking reaction involving trimerization of at least one of a first monomer containing cyano groups and a second monomer containing a stereo-contorted structure catalyzed by trifluoromethylsulfonic acid or lewis acid. In some embodiments, the cross-linking reaction includes a catalytic homocoupling of a first monomer containing arylbromide or ethynyl groups and an optional second monomer containing a stereo-contorted structure. In some embodiments, the cross-linking reaction involves a condensation coupling of a first monomer containing ketone, aldehyde, or anhydride and a second monomer containing arylamine. In some embodiments, the cross-linking reaction involves a first monomer containing chloromethyl group and a second monomer containing a stereo-contorted structure through Friedel Crafts reaction. In one aspect, a fuel cell is provided which includes the electrocatalyst as a substrate in the anode or cathode.

BRIEF DESCRIPTION OF THE FIGURES

FIGS. 3A-3D show four different reaction schemes of synthesis of a porous polymer, PBPY4, PBPY5, PBPY6, PBPY7;

FIG. 12A(1) shows a sample from Example 9 examined by transmission electron microscopy (TEM) with sample activation at 500° C. and magnification defined by the 50 nm scale bar and FIG. 12A(2) a higher magnified version of 12A(1); FIG. 12B(1) is also the Example 9 material but activated at 700° C. with the indicated magnification for the TEM image and FIG. 12B(2) a higher magnified version of 12B(1);

DETAILED DESCRIPTION OF PREFERRED EMBODIMENTS

Figure 1:
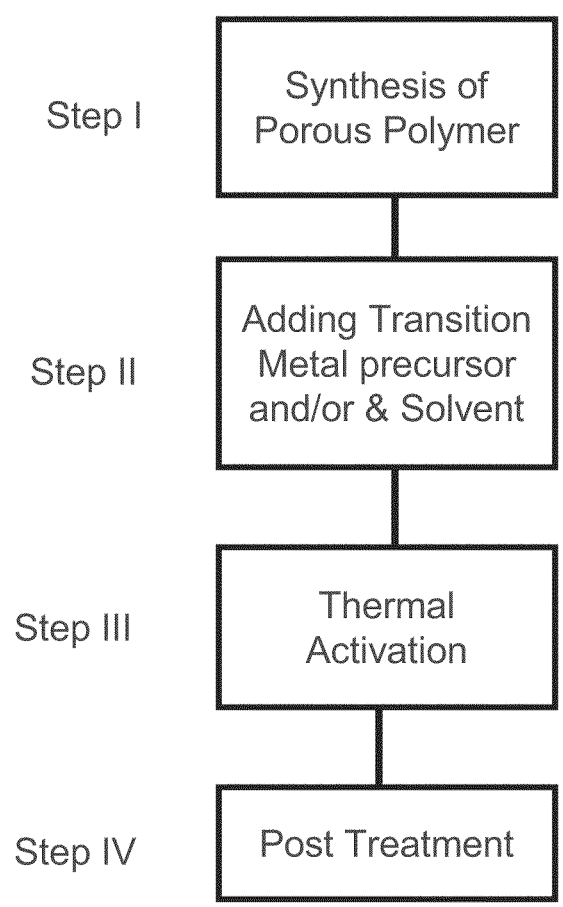
FIG. 1 shows a process flow chart of preparing non-PGM catalyst using porous polymer materials as the precursor.

In a fuel cell, a cathodic oxygen reduction reaction, such as that described by Equation 2 hereinbefore, typically occurs at the surface of platinum in the electro-catalyst. Molecular oxygen is first adsorbed on the Pt active site and is subsequently converted to water by capturing four electrons and reacting with four protons.

In one embodiment, electroactive material or non-PGM electrocatalysts are produced using thermally treated, transition metal-containing porous polymers. The new materials are prepared according to the process flow chart in FIG. 1, and can be described by the following steps: I) preparing the porous polymer through cross-linking monomers with stereo-contorted cores and functional groups such as nitrogen-containing groups that can serve as coordination sites. The cross-linking reaction could be cyclization or coupling of the terminal functional groups of the monomers: such as trimerization of ethynyl groups catalyzed by transition metal catalysts (dicobalt octacarbonyl, etc), trimerization of cyano groups catalyzed by trifluoromethylsulfonic acid or lewis acid (zinc chloride, etc); oxidative coupling of thiophenyl groups promoted by chemical oxidant FeCl$_3$ or by constant voltage bias, homocoupling of arylbromide or ethynyl groups catalyzed by nickel catalyst or palladium catalyst; condensation coupling of arylamine with ketone, aldehyde, or anhydride; and cross-linking through Friedel Crafts reaction.

Not limited by the scientific hypothesis, the monomers with stereo-contorted core are used to produce micropore, mesopore and high surface area whereas the monomers with N-, O- or S-containing functional groups are used to produce ligation sites for transition metal inside of the porous polymers. The monomers with stereo contorted core refer to those molecules with functional groups that produce cross-linking at orthogonal, tetrahedral, or any three-dimensional direction. Non-limiting examples of such functional groups include spirobifluorene, and tetraphenyl methane. The cross-linking reaction may also be performed in the absence of the stereo-contorted core. In the absence of the stereo-contorted core, the high surface area and porosity polymers may be produced through hindrance of the functional groups in the monomers when they are cross-linked together. For example, porphyrin monomers contain macrocyclic ring with large molecular dimensions. Such monomers possess stereo-hindrance when they are cross-linked by coupling reactions.

The polymerization process, therefore, produces high surface area and high porosity polymers with transition metal ligation site uniformly distributed throughout. Once the polymerization process is completed, the polymer is filtered and separated from the solvent and ready for the next step; II) the porous polymers prepared in step I) could already contain transition metals if monomers coordinated with transition metals (such as Co, Fe, Ni, etc) are used for the cross-linking polymerization, and can be further infused with transition metals such as Co, Fe, Ni, Cr, Cu, Mn, Ta, W and other conventional transition metals. Such metals can be added in the porous polymer using their respective organometallic compounds or inorganic salts. These compounds can be added through liquid phase or gas phase processes, such as a conventional wet-incipient approach, impregnation, chemical vapor deposition, and other methods. The added metals will either be coordinated into the ligation sites through chemical reaction or entrapped into the micropores inside of the polymers.

In addition to metals, nitrogen-containing organic compounds can also be added into the polymers through liquid, solution or gaseous methodologies. While not being limited by the scientific hypothesis, the addition of the organic compounds are expected to coordinate with metal ion inside of the polymers that will promote the formation of the electrocatalytic active sites during the next process step of thermal treatment; III) the processed polymer materials produced in step II) will be thermally treated in the inert atmosphere such as under Ar or $N_2$ or reactive environment under nitrogen containing gas such as $NH_3$, pyridine or acetonitrile at the elevated temperature. The polymers will be converted to carbonaceous material decorated with the catalytic center after this process; IV) a post treatment can be optionally added after the thermal treatment to further improve the electrocatalytic activity. The post treatment method can include one or more approaches such as acid treating, ball milling or a secondary heat-treating either in inert atmosphere or nitrogen containing gases such as $NH_3$, pyridine or acetonitrile, etc.

The electrode catalysts prepared by the methods of the invention may exhibit several advantages over that of prior art in the following aspects: a) high surface area—porous polymers are generally a high surface area material. Even after the high temperature treatment, a substantial fraction of the surface area can be maintained at the pre-treatment level or even enhanced. High surface area enables the exposure of catalytic active sites to the reactants which is important for fuel cell applications; b) high active site density—porous polymers are synthesized through cross-linking of stereo-contorted core and monomers with ligation sites for transition metals. Such ligation sites are distributed in high density inside of porous polymer framework for interaction with transition metals. High transition metal to carbon and nitrogen ratio therefore provides a higher number of the catalyst site per unit volume when porous polymers are used as initial material for non-PGM catalyst preparation. Such approach does not require mixing with other support materials such as carbon which often dilute the volumetric density of the active site; c) uniform catalyst site distribution—porous polymers have well defined metal coordination sites evenly distributed throughout the porous structure, which will lead to uniformly distributed catalyst sites after the heat-treatment process. Such approach also offers better homogeneity than that mixed with support materials such as carbon which do not contain catalytic active sites by themselves; d) ease of chemical exchange—often the catalytic activity of the material can be further enhanced when thermally treated in the presence of another chemicals such as a precursor of another transition metal or another N-containing organic compound. Porous polymers have a high fraction of pores with uniformly distributed cavity. Such void spaces can be used to accommodate different precursors, such as the transition metal compounds or N-containing organic compounds through an efficient chemical processes, such as solvent exchange. The added chemicals are also in immediate proximity of the transition metal for effective formation of the catalytic active sites during the heat-treatment process.

A preferred process of preparing non-PGM electrode catalysts using porous polymers as precursors includes the following steps:

Step I—Preparing Porous Polymers.

Porous polymers can be prepared by cross-linking one or two types of monomers functionalized with appropriate functional groups, such as ethynyl, cyano, thiophenyl, fluoro/bromo/iodo, amino, ketone, aldehyde, carboxylic anhydride, chloromethyl, and etc. The cross-linking reactions to obtain porous polymers include but not limited to: trimerization of ethynyl groups catalyzed by transition metal catalysts (dicobalt octacarbonyl, etc), trimerization of cyano groups catalyzed by trifluoromethylsulfonic acid or lewis acid (zinc chloride, etc); oxidative coupling of thiophenyl groups promoted by chemical oxidant $FeCl_3$ or by constant voltage bias, homocoupling of arylbromide or ethynyl groups catalyzed by nickel catalyst or palladium catalyst; condensation coupling of arylamine with ketone, aldehyde, or anhydride; and Friedel Crafts reaction between chloromethyl and phenyl groups. In a preferred embodiment of the current invention, one of the monomers contains nitrogen coordination sites for incorporating transition metals, the other monomer has stereo-contorted structure, such as spirobifluorene, tetraphenylmethane and triphenylamine, for maintaining the porous structure of the resulting polymer.

Figure 2:
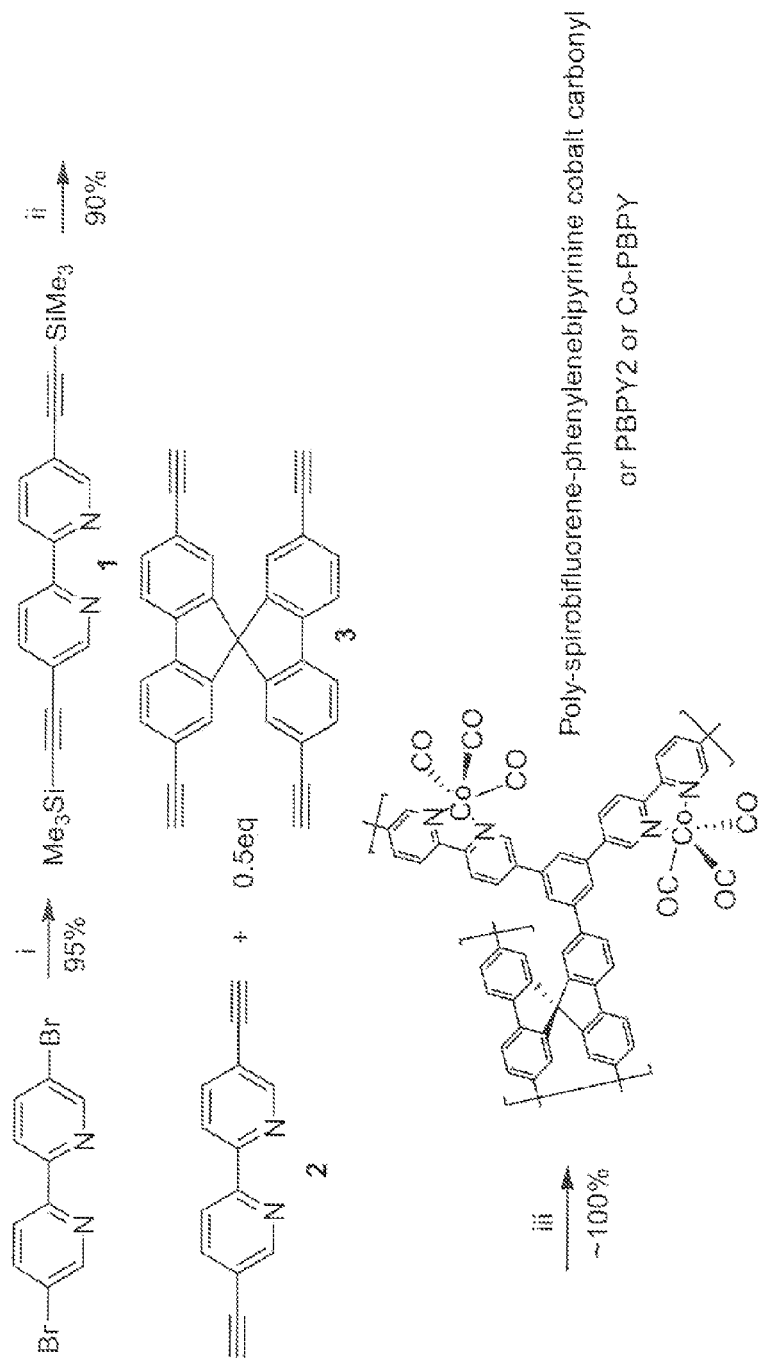
FIG. 2 shows a reaction scheme of synthesis of a porous polymer, PBPY2.

For example, ethynyl functionalized bipyridine and spirobifluorene could form porous polymers through trimerization of the ethynyl groups or homocoupling of the same ethynyl groups, as is shown by reaction scheme in FIG. 2. If the terminal functional groups of bipyridine and spirobifluorene are changed to amine or aldehyde groups, they could form porous polymer through condensation coupling reaction, as is shown by Equation 1 in FIG. 3A; if the terminal functional groups of bipyridine and spirobifluorene are changed to bromo groups, the could form porous polymers through homocoupling reaction, as is shown by Equation 2 in FIG. 3B; if the terminal functional groups of bipyridine and spirobifluorene are changed to chloromethyl groups, they could form porous polymers through Friedel Crafts alkylation reaction, as is shown by Equation 3 in FIG. 3C; if the terminal functional groups of bipyridine and spirobifluorene are changed to cyano groups, they could form porous polymers through trimerization of the cyano groups, as is shown by Equation 4 in FIG. 3D. In another preferred embodiment, one monomer can be used for self-cross-linking if it combines both nitrogen-containing coordination site and stereo-contorted structure in one. The stereo-contorted structure could also be attributed to the stereo-hindrance of the monomer during the cross-linking reaction. An example is polymerization of thiophenyl functionalized porphyrin to form porous polymer with N4 coordination site for transition metals.

Figure 4:
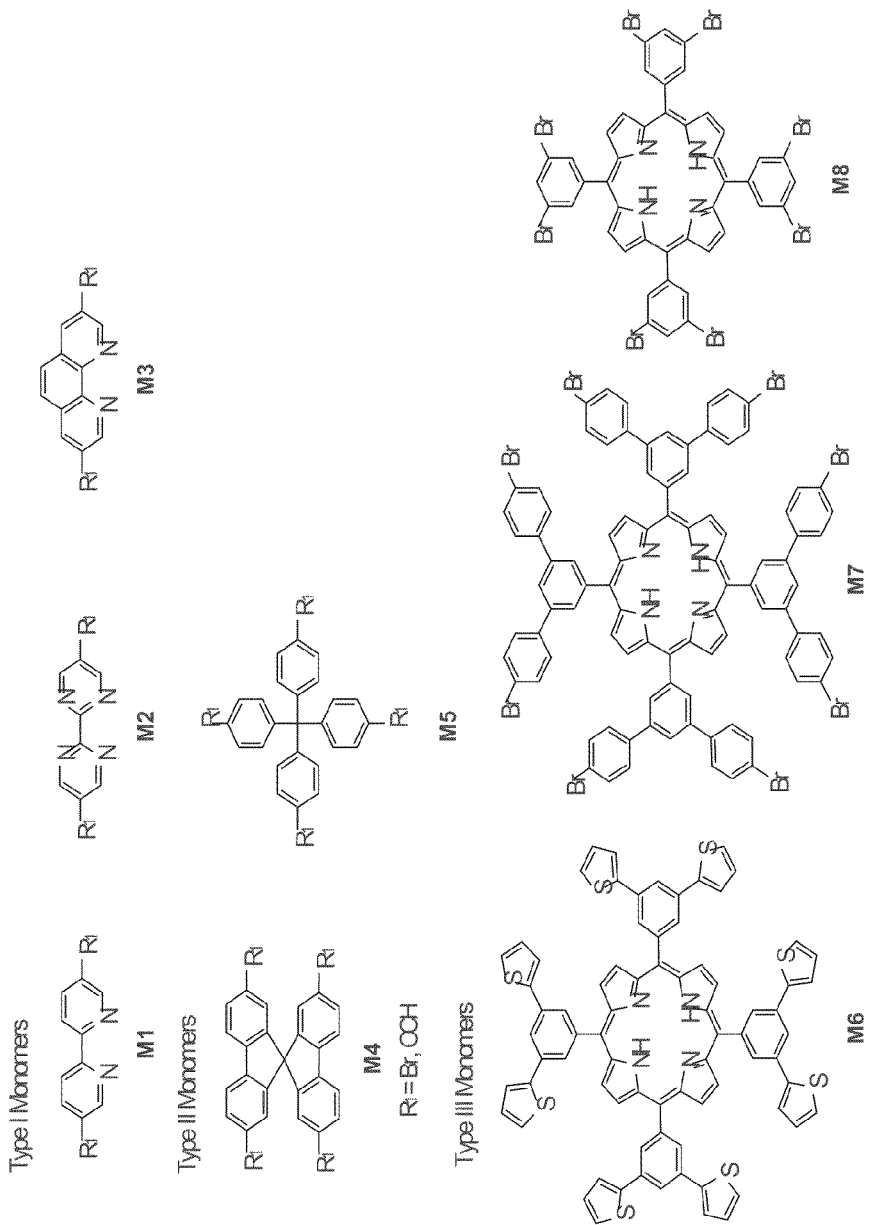
FIG. 4 shows selected monomers (I, II and III) which are preferably used for preparing porous polymers as the catalyst precursors.

Examples of these three types of monomers (types I, II and III) are illustrated by FIG. 4. Type I are monomers with nitrogen-containing ligation sites for transition metals, such as 4,4'-diethynyl-2,2'-bipyridine (M1), 5,5'-diethynyl-2,2'-bipyrimidine (M2), and 3,8-diethynyl-1,10-phenanthroline (M3). Type II are monomers with stereo-contorted core, such as 2,2',7,7'-tetraethynyl-9,9'-spirobifluorene (M4), tetrakis (4-ethynylphenyl)methane (M5). Type III are thiophenyl functionalized porphyrin and arylbromide functionalized porphyrins. For one preferred form of the current invention, one monomer from Type I and another monomer from Type II are selected for cross-linking reaction. An example include one monomer containing sipirobifluorene (M4) and another monomer containing bipyridine (M1) in 1 to 2 ratio were dissolved in organic solvent to obtain a clear solution; and the concentration of each monomer ranges from 0.01 mol/L to 0.05 mol/L; metal complexes in equal amount of bipyridine were added to coordinate with the monomer containing bipyridine. Examples of the metal complexes for coordination include, but are not limited to $CO_2(CO)_8$, $Co(hfac)_2$, $Fe(hfac)_2$, $Ni(hfac)_2$, where hfac represents hexafluoroacetylacetonate.

In some embodiments, the transition metal catalyst, such as $CO_2(CO)_8$, is added, and the reaction mixture may be stirred well before refluxing for 1.5 hours. In one embodiment, only one monomer from Type III may be used for polymer preparation. An example is a porphyrin functionalized with thiophenyl groups (M6) or arylbromide groups (M7 and M8) may be incorporated with a metal ion, such as Fe (II), Co(II), Ni(II), Mn(II), Cu(II), Zn(II), etc. The metalloporphyrin may then dissolved in appropriate solvent, such as chloroform, acetonitrile, or dimethylformamide. Thiophenyl functionalized porphyrin monomer solution in chloroform or acetonitrile was prepared by adding the monomer to a suspension of FeCl$_3$ in chloroform or acetonitrile dropwise. Then, the reaction mixture can then be stirred for 12 hours; in the case of arylbromide functionalized porphyrin monomers, to their solution in dimethylformamide was added bis(1,5-cyclooctadiene)nickel(0), bipyridine and 1,5-cyclooctadienem the reaction mixture was then heated at 80° C. for 24 to 72 hours. The polymers may be collected via filtration after washing with methanol and/or hydrochloric acid.

Step II—Addition of Transition Metals and Organic Compounds.

The porous polymers generally have high porosity with narrowly distributed pore sizes in nanometer scale. The pores in these polymers can be used to entrap additional transition metals and/or nitrogen-containing organic compounds that can promote formation of catalytic active sites. Various methods, such as post-coordination, adsorption, chemical evaporation, can be used to add precursors containing transition metals and/or organic compounds into the porous polymers. For example, to add transition metal complexes into the polymer, a solution of metal complexes in ethanol was refluxed with fine powder of the polymer that contains bipyridines or porphyrin for 12 hours or so, metal complexes will chemically coordinate with the bipyridine sites and this is the so called post-coordination method. To add transition metals and/or organic compounds to the polymers without free coordination sites, a solution of the transition metals and/or organic compounds in ethanol was gently refluxed with a suspension of the porous polymers in an open vial until the solvent dried out, most of the transition metals and/or organic compound will be adsorbed by the porous polymer. In this embodiment, transition metals that can be used include, but are not limited to, ferrocene, tantalum chloride, Prussian blue, iron nitrate, cobalt nitrate, iron acetate or cobalt acetate. Nitrogen-containing organic compounds used in this embodiment include, but are not limited to, imidazole, cyanamide, dimethylformamide, dimethylacetamide, pyridine or 1,10-phenanthroline. After the addition of chemical moieties, the porous polymer materials can be subjected to the thermal conversion as described in the Step III.

Step III—Thermal Activation of Processed Porous Polymers.

During this step, the porous polymer materials prepared from Step II will be subjected to a high temperature treatment. Such treatment will partially decompose and carbonize the polymers. This treatment serves two purposes: a) forming active site through the reaction between ligated metal center and the polymer framework, and optionally with added organic materials through pyrolysis; and b) improving the electron conductivity of the framework materials by carbonizing the polymer framework so that the charge can be more effectively transferred to and from the catalytic active site during the electrochemical reaction. The thermal conversion of the polymer material is generally conducted in a controlled environment, such as a sealed reactor or a flow reactor surrounded by heating element. In a preferred embodiment, the treatment is carried out inside of a tubular reactor under the constant flow of carrier gas surrounded by temperature controlled furnace. The thermal conversion temperature typically ranges from 400° C. to 1100° C. In a more preferred embodiment, the temperature ranges from about 600° C. to 1000° C. In an even more preferred embodiment, the temperature ranges from about 700° C. to 800° C. The time sample under the thermal conversion temperature should also be controlled. According to the present embodiment of invention, the thermal treatment time should be controlled between 30 minutes to 3 hours. In the more preferred embodiment, the time under the treatment of temperature should be 30 minutes to 120 minutes.

Another condition for thermal treatment should be carefully controlled is the chemical composition of the carrier gas. In one embodiment of the invention, the carrier gas should be inert gases such as Ar,He, or nitrogen. In another embodiment of the invention, the carrier gas should be reductive and containing nitrogen. The examples of such reducing carrier gas include, but not limited to, NH$_3$, pyridine or acetonitrile.

Step IV—Post Treatment.

After the thermal conversion process in step III, the material can be processed through a post-treatment step to further improve the electrocatalytic activity. According to one embodiment of current invention, the post-treatment can be accomplished through acid washing. A variety of inorganic acids can be used to dissolve the excess amount metals in the material from Step III by simply immersing the thermally treated porous polymer in the acid solution. The acid for this application include hydrochloric acid, sulfuric acid, nitrate acid, and other acid known to dissolve metals. In one embodiment the concentration of the acid can be at lower concentration in the range of about 0.1 molar to undiluted concentration. In a preferred embodiment, the concentration of the acid ranges from about 0.5 molar to 2 molar. The acid treatment temperature can range from the ambient to as high as about 80° C. The acid treatment time ranges from about 0.5 hour to 72 hours. According to another embodiment of the invention, the porous material obtained after Step III before or after acid wash in Step IV can be further treated under elevated temperature in an inert gas flow or in a nitrogen-containing gas flow under the similar temperature and carrier gas described in Step III. Not limited by the scientific hypothesis, such a second thermal treatment after acid washing can further improve the electrocatalytic activity by restructuring the nonactive to active site and by adding more active site through incorporating more nitrogen into carbonaceous framework. Examples of such reducing carrier gas include, but are not limited to, NH$_3$, pyridine or acetonitrile.

The process of preparing electrocatalyst according to the embodiments of the current invention can be further elucidated by the following non-limiting examples:

Example 1

FIG. 2 shows the synthetic approach to preparing polymer PBPY2 which contains bipyridine coordinate site for incorporating transition metals into the polymer. Cobalt carbonyl, which served as both coordination metal complex and catalyst of the trimerization reaction, was stirred well with a solution of compounds 2,2',7,7'-tetraethynyl-9,9'-spirobifluorene and 5,5'-diethynyl-2,2'-bipyridine in anhydrous dioxane, and the mixture was then brought to reflux to initiate the polymerization reaction. The product PBPY2 is a porous polymer with surface area in the range of 250-400 m$^2$/g. Elemental analysis showed that the polymer contains about 8H$_2$O and 1.48 CO$_2$(CO)$_8$ per repeating unit (C$_{61}$H$_{32}$N$_4$). TGA (Thermal Gravimetric Analysis) of PBPY2 showed that all of the 8H$_2$O loses around 100° C. (corresponding to 10% weight lost), while all of the carbonyl groups lose around 300° C. (corresponding to 32.3% weight lost). More detailed preparations of chemicals and polymer are described in the following:

Compound 1 (5,5'-Bis(trimethylsilylethynyl)-2,2'-bipyridine) in FIG. 1 was synthesized according to conventional reported methods.

Compound 2 (5,5'-Diethynyl-2,2'-bipyridine): 5,5'-Bis(trimethylsilylethynyl)-2,2'-bipyridine (1.65 g, 4.73 mmol) was dissolved in 20 ml of methanol and 30 ml of THF, KF (0.70 g, 12.0 mmol) was added at room temperature, and the mixture was stirred for 6 hours. Solvent was removed using a rotary evaporator, and the residue was dissolved in dichloromethane and filtered through a pad of basic alumina (activity IV), the filtrate was concentrated and the solid was recrystallized from chloroform/ethanol to give the product 0.87 g (90% yield). $^1$H NMR (CDCl$_3$): 3.31 (s, 2H), 7.90 (dd, J=8.0 Hz, 2.0 Hz, 2H), 8.39 (d, J=8.0 Hz, 2H), 8.77 (d, J=2.0 Hz, 2H).

Compound 3 (2,2',7,7'-tetraethynyl-9,9'-spirobifluorene) was synthesized according to the following procedure; a) Fe powder (0.075 g, 1.33 mmol) was added to a solution of 9,9'-spirobifluorene (7.0 g, 22.1 mmol) in 33 mL of chloroform, the mixture was then cooled to 0° C., then neat bromine (4.9 mL, 95.03 mmol) was added slowly via a syringe. The mixture was stirred at 0° C. for 1 h, then warm to room temperature, continue stirring for another 3-5 h, and the evolved HBr gas was exported to a NaOH solution. The reaction mixture was then poured into saturated Na$_2$CO$_3$ solution to remove the excess Br$_2$, and extracted with CH$_2$Cl$_2$ twice. The combined organic phase was washed with brine once, separated and dried over anhydrous Na$_2$SO$_4$. After removing the solvent, white solid product 2,2',7,7'-tetrabromo-9,9'-spirobifluorene (14.0 g, 99% yield) was obtained in its pure form. Further purification could be done by crystallization from CHCl$_3$/EtOH mixture. $^1$H NMR: δ (ppm): 6.82 (d, J=1.6 Hz, 4H, Ar—H), 7.54 (dd, J=1.8, 8.2 Hz, 4H, Ar—H), 7.68 (d, J=8.2 Hz, 4H, Ar—H). b) The above product 2,2',7,7'-tetrabromo-9,9'-spirobifluorene (3.0 g, 4.75 mmol), PdCl$_2$(PPh$_3$)$_2$ (0.26 g, 0.37 mmol), CuI (0.036 g, 0.19 mmol) and PPh$_3$ (0.2 g, 0.76 mmol) were placed in a round bottom flask, anhydrous i-Pr$_2$NH (50 mL) and trimethylsilyl acetylene (3.24 mL, 22.8 mmol) were added via a syringe. The reaction mixture was brought to reflux overnight then cooled down to room temperature. Solvent was removed in vacuum, and CHCl$_3$ was added to dissolve the residue, and filtered through a pad of celite. The filtrate was washed with dilute Na$_2$EDTA solution, and then dried over anhydrous Na$_2$SO$_4$, the solution was concentrated and ethanol was added to obtain white solid product 2,2',7,7'-tetra(trimethylsilyl acetyl)-9,9'-spirobifluorene (3.0 g, 90% yield) in its pure form. $^1$H NMR: δ (ppm): 0.16 (s, 36H, CH$_3$), 6.77 (d, J=0.8 Hz, 4H, Ar—H), 7.49 (dd, J=1.4, 7.9 Hz, 4H, Ar—H), 7.74 (d, J=7.9 Hz, 4H, Ar—H). $^{13}$C NMR: δ (ppm): 0.4, 96.1, 106.0, 121.4, 124.0, 128.9, 133.4, 142.5, 149.2. c) NaOH (0.286 g, 7.1 mmol) was dissolved in 5 mL CH$_3$OH, then add to a solution of 2,2',7,7'-tetra(trimethylsilyl acetyl)-9,9'-spirobifluorene (0.5 g, 0.71 mmol) in 20 ml CH$_2$Cl$_2$, then stirred for 6 h at room temperature. The reaction mixture was washed with water, and the aqueous phase was extracted with CH$_2$Cl$_2$ once, combined organic phase was washed with brine, and then dried over anhydrous Na$_2$SO$_4$. The solution was concentrated and ethanol was added to the solution. Light yellow solid product 2,2',7,7'-tetraethynyl-9,9'-spirobifluorene (0.273 g, 95% yield) was obtained in its pure form. $^1$H NMR: δ (ppm): 3.01 (s, 4H, CCH), 6.866 (d, J=0.8 Hz, 4H, Ar—H), 7.54 (dd, J=1.4, 7.9 Hz, 4H, Ar—H), 7.80 (d, J=7.9 Hz, 4H, Ar—H).

Synthesis of cobalt doped polymer Co-PBPY: 2,2',7,7'-tetraethynyl-9,9'-spirobifluorene (0.484 g, 1.17 mmol) and 5,5'-Diethynyl-2,2'-bipyridine (0.480 g, 2.34 mmol) were added into a flame-dried round bottom flask, anhydrous dioxane 20 mL was added via a syringe, the mixture was stirred to get clear light yellow solution. CO$_2$(CO)$_8$ (0.594 g, 1.736 mmol) was added under protection of N$_2$. The reaction mixture was stirred at room temperature for 20 minutes. The flask was then placed into oil bath that was pre-heated to 115° C. The brown solution started to solidify after about 5 minutes. The reaction mixture was heated for another hour, and lifted above the oil bath to cool to room temperature. The brown solid was crushed to fine particles using a spatula, then washed with dioxane, and filtered to collect the solid. After air-drying for an hour, the solid was dried in vacuum oven at 100° C. for 1 day. About 1.56 g (100%) of brown solid was obtained. Elemental Analysis: Calculated for {C$_{61}$H$_{32}$N$_4$[CO$_2$(CO)$_8$]$_{1.48}$}x: C, 65.93; H, 2.43; Co, 13.15; N, 4.22. Found: C, 60.26; H, 3.20; Co: 10.91; N, 3.60; corresponding to formula {C$_{61}$H$_{32}$N$_4$[CO$_2$(CO)$_8$]$_{1.48}$(H$_2$O)$_8$}x, suggesting that the polymer contains 8H$_2$O per repeating unit.

Example 2

Figure 5:
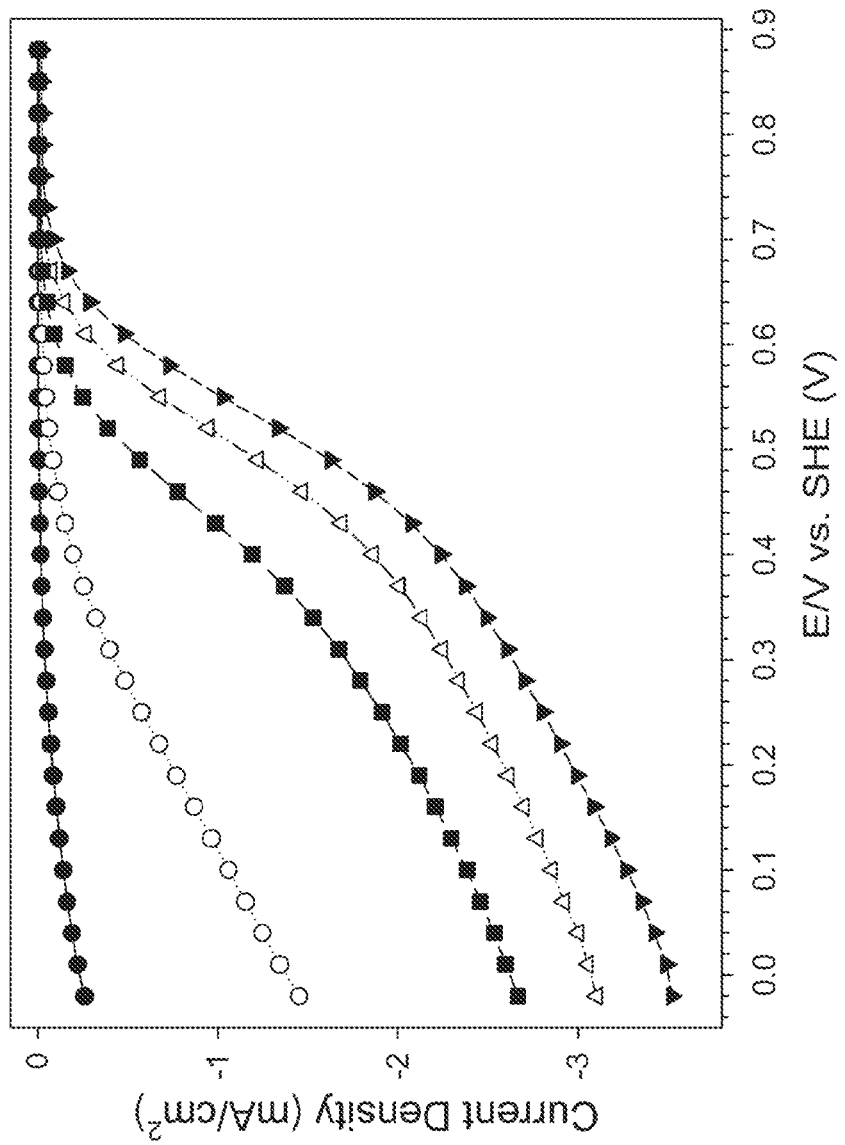
FIG. 5 shows polarization curves from a ring rotating disk electrode (RRDE) study of PBPY-2 treated at 500° C. (solid circle), 600° C. (hollow circle), 700° C. (solid triangle), 800° C. (hollow triangle), and 900° C. (solid square) and with a rotating speed=1600 rpm, and catalyst loading=800 µg/cm$^2$.

The cobalt-containing polymer Co-PBPY prepared according to Example 1 was heat treated at temperatures ranging between about 500 and 900° C. in the flowing argon for 60 minutes inside of a quartz reactor. The sample obtained after heat treatment was used to prepare the ink for the electrochemical characterization experiments. The ink containing the Co-based electrocatalysts was prepared using a 3:7 Nafion ionomer to Catalyst ratio, dissolved in 5 wt % Nafion® ionomer and methanol. The solution obtained was magnetic stirred for at least a week before testing. The ink thus prepared was applied to a glassy carbon electrode in a rotating disk electrode setup of CH1760D Electrochemical Workstation. Cyclic voltammograms in argon and oxygen gases were recorded at a rotation speed of 1600 rpm and a scan rate of 10 mV/s. The argon background is subtracted from the oxygen polarization curves, and the corrected current densities are plotted vs. standard hydrogen electrode (SHE) potential. The onset potential for ORR is defined as the voltage value at which point the polarization current measured in the oxygen saturated electrolyte starts to deviate from the background value measured with argon purged electrolyte. FIG. 5 shows the impact of the different treatment temperature on the ORR activity of the Co-PBPY material. The onset potential increases as the treatment temperature increases, reaching a maximum at 700° C. with the onset potential reaching a maximum value of 0.78 V. The Brunauer, Emmett, Teller (BET) surface area of the fresh sample was around 210 m$^2$/g, and increased to around 550 m$^2$/g after pyrolysis at 700° C.

Example 3

Figure 6:
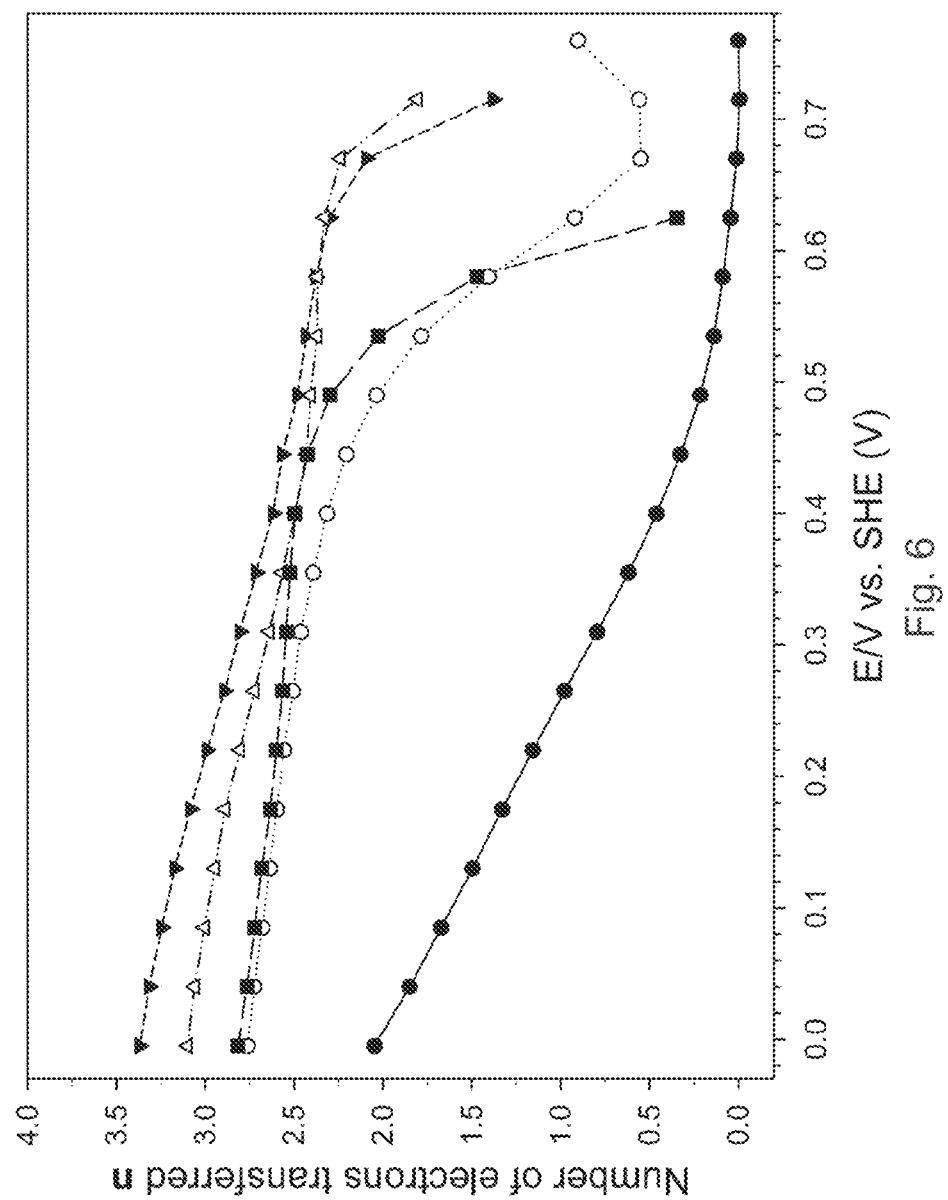
FIG. 6 shows electron transfers for PBPY-2 treated under Ar at 500° C., solid circles; 600° C., hollow circles; 700° C., solid triangles; 800° C., hollow triangles; 900° C., solid squares.

A desirable characteristic of a non-PGM catalyst is the ability to reduce oxygen directly to water via the four electron transfer mechanism. Rotating ring disk electrode (RRDE) experiments give the number of electrons transferred during oxygen reduction, as a proportion between the disk current and the ring current, according to:

$$n = \frac{4I_d}{I_d + \frac{I_r}{N}}$$

Where n is the number of electrons transferred or selectivity, $I_d$ the disk current, $I_r$, the ring current and N the collection efficiency of the electrode. FIG. 6 shows the number of electron transfer as the function of electrode potential measured for the catalyst sample prepared by heat treated porous polymer at 700° C. according to Example 2.

Example 4

Figure 7:
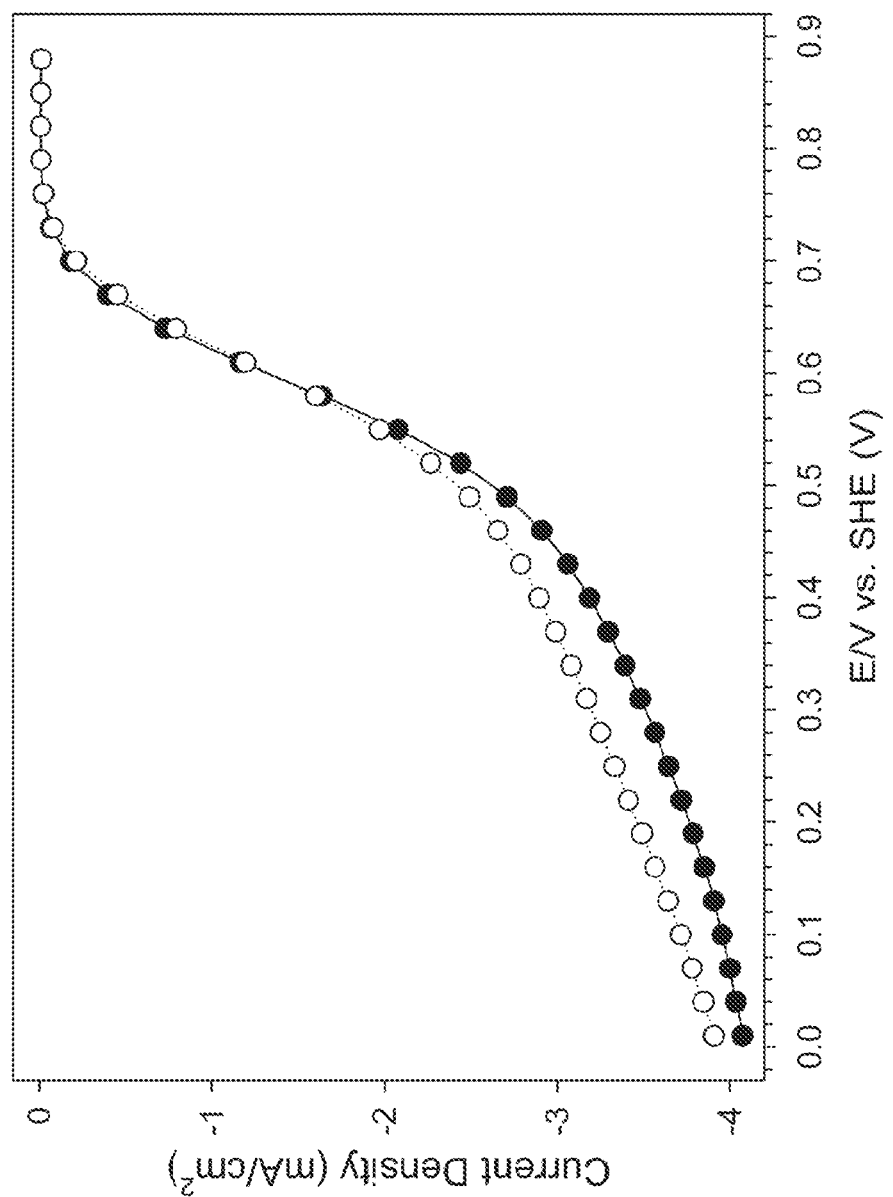
FIG. 7 shows ORR activity for PBPY2 treated at 700° C. with different cobalt contents of about 20% (solid circle) and 1.7% (hollow circle)

A polymer prepared according to the Example 1 was washed in concentrated HCl to reduce the Co content to about 1.2%. The acid washed sample was further thermally treated at 700° C. in flowing argon according to the step described in Example 2. The catalyst ink was subsequently prepared and tested according to the procedure described in Example 2. FIG. 7 compares the ORR activity of this catalyst sample with that prepared 700° C. without acid pre-washing. No significant difference was observed in the catalytic performance despite the Co content being much lower in the current example.

Example 5

Figure 8:
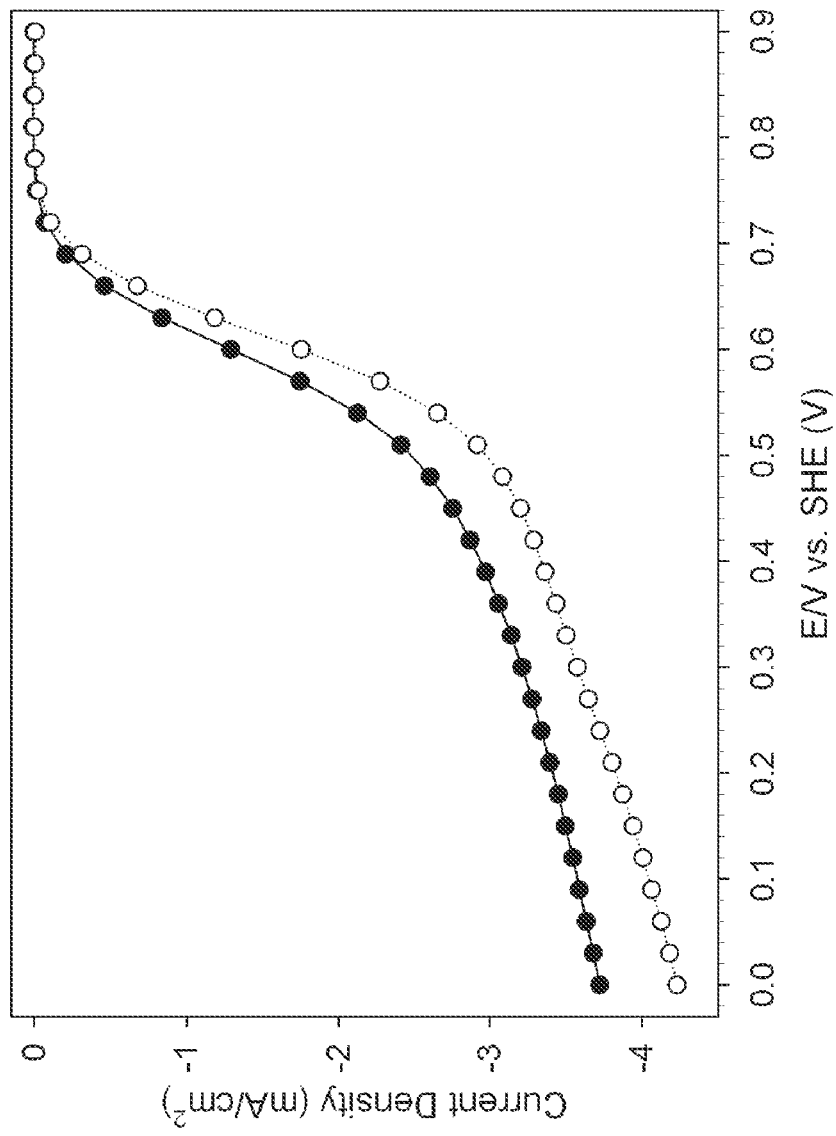
FIG. 8 shows RDE results for a Co-PBPY after heat-activation at 700° C. (solid circles) and RDE results for 700° C. heat activated sample, followed with immersion and washing with 0.5 M H2SO4 (hollow circles)

After the Co-PBPY is pyrolyzed, additional chemical treatments can lead to improved catalytic activity. For example, electrocatalytic improvement was observed when the Co-PBPY, heat treated at 700° C., was acid leached in 0.5 M $H_2SO_4$. The acid leach can wash the excess metal away, exposing hidden catalytic sites to the ORR reaction. It also helps to sulfonate and/or oxidize the carbonaceous framework, making it easier to interact with Nafion ionomer. FIG. 8 shows both current density and half-wave potential improved after acid leaching of treated Co-PBPY, possibly due to improved mass transfer due to better exposure of more catalyst site through removal of excess metallic cobalt.

Example 6

Figure 9:
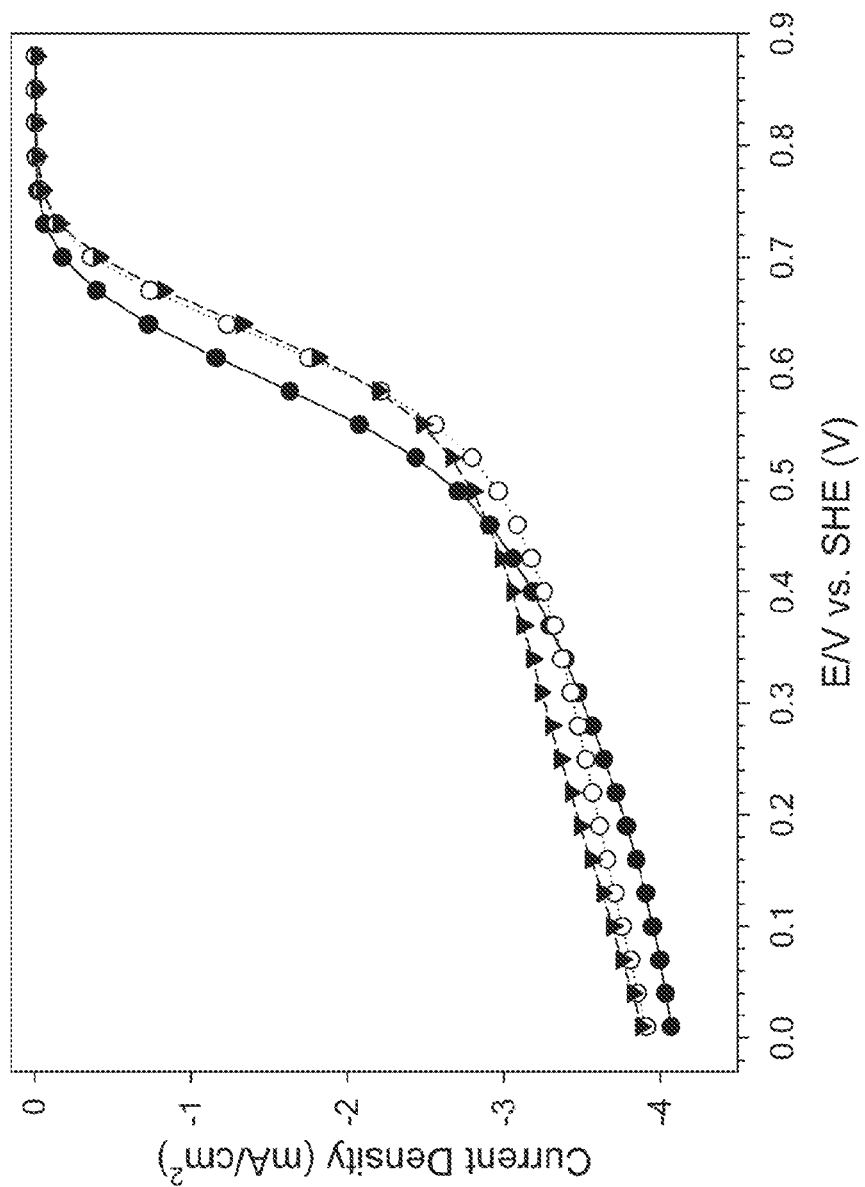
FIG. 9 shows RDE results for Co-PBPY at 700° C. (solid circles); Co-PBPY/cyanamide treated at 700° C. under Ar (hollow circles); and Co-PBPY/imidazole treated at 700° C. under Ar (solid triangles)
Figure 10:
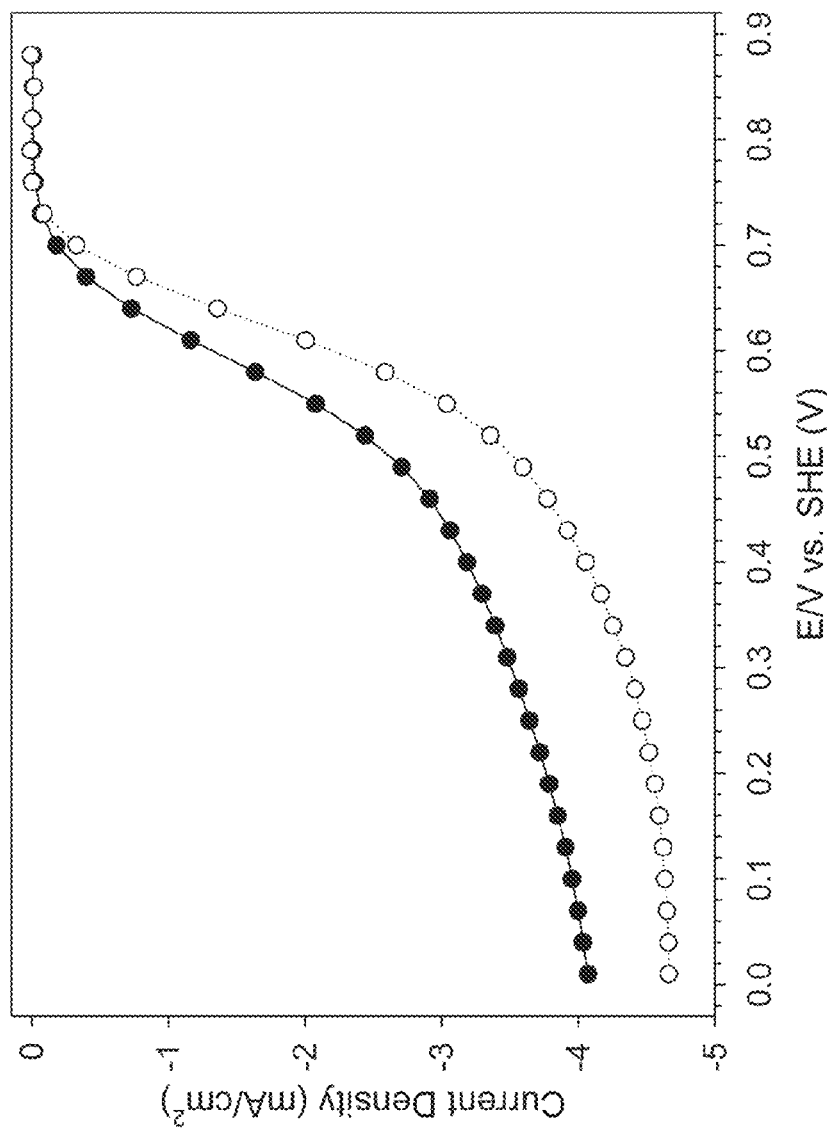
FIG. 10 shows ORR activity for a Co-PBPY sample that was heat treated at 700° C. under Argon (solid circle), in comparison with a sample followed by another heat treatment under NH3 at 600° C. for one hour (open circle)

Introducing pyridinic or pyrolic nitrogen to the sample can form additional catalytic sites when the nitrogen coordinates to excess cobalt complexes. The pyridinic or pyrolic nitrogen can be added by impregnating N-containing organic compound, such as imidazole or cyanamide, to the fresh polymer sample (as prepared Co-PBPY polymer), followed by the heat-treatment under Ar as described by Example 2. FIG. 9 shows influence on catalytic performance by adding imidazole and cyanamide to Co-PBPY polymer before heat treatment. Both ORR onset potentials and half-wave potentials were improved through introducing nitrogen-containing organic compound to the sample before the activation step.

Example 7

Another way to introduce nitrogen to the catalyst sample is through post-treating carbonized polymer with N-containing compound under elevated temperature. FIG. 9 shows the ORR activity for a Co-PBPY sample that was heat treated at 700° C. under Argon followed by another heat treatment under $NH_3$ at 600° C. for one hour. RDE experiment showed improved current density over that of the sample without the ammonia treatment.

Example 8

Figure 11A:
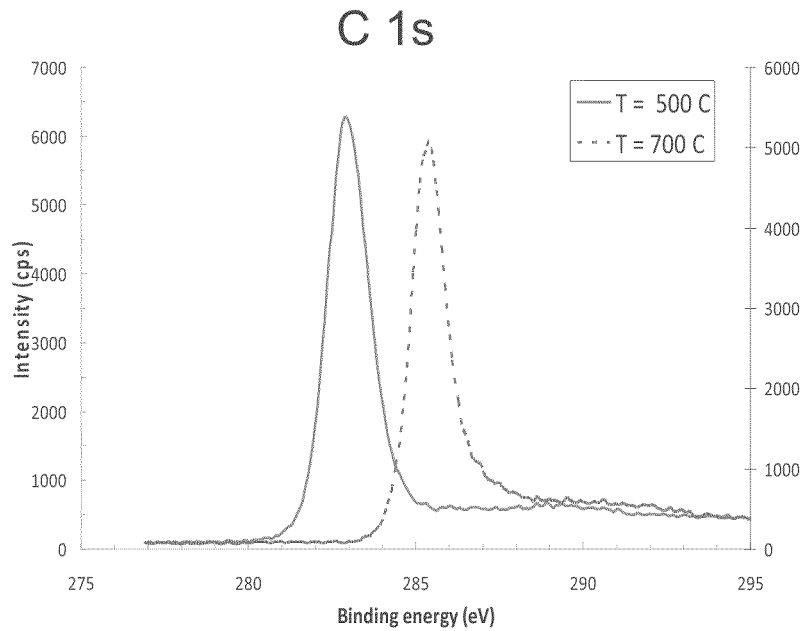
FIG. 11A shows XPS system results for carbon C1s for a sample treated for Example 8 activated at 500° C.; and also shows the same starting sample activated at 700° C.
Figure 11B:
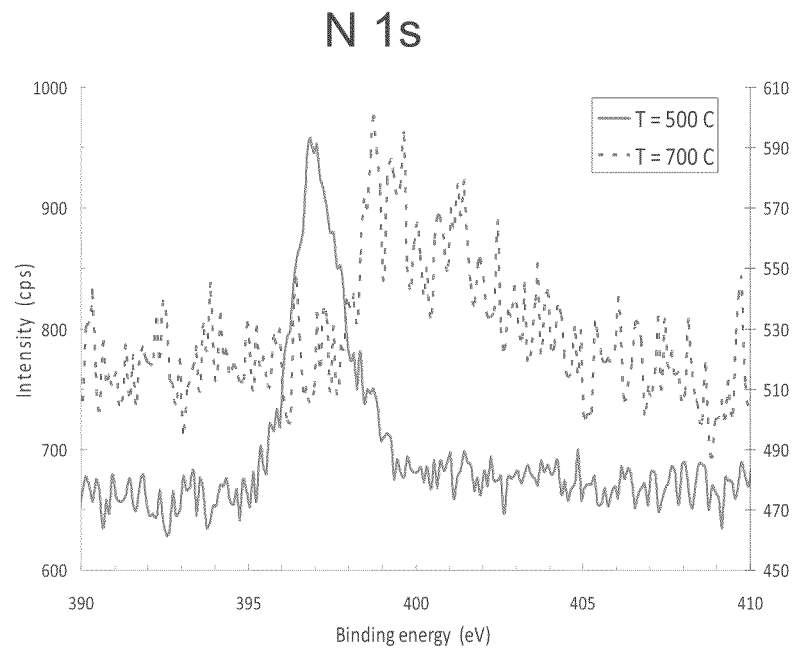
FIG. 11B shows the XPS system results for nitrogen N1s as for conditions of FIG. 11A.

The thermally treated samples prepared according to the method in Example 4 were studied by X-ray photoelectron spectroscopic method (XPS) in order to understand the catalytic active site structural changes during the thermal activation. Shown in FIGS. 11A and 11B are XPS spectra of carbon C1s and nitrogen N1s for the sample activated at 500° C. and 700° C., respectively. As demonstrated by Example 4, the precursor converts from polymer to catalyst at these temperatures. FIGS. 11A and 11B clearly showed the change in the electronic structures of both carbon and nitrogen, from molecular moiety inside of a polymer to a carbonaceous material during the transition from polymer to electrocatalyst.

Example 9

The thermally treated samples prepared according to the method in Example 4 were also studied by the transmission electron microscopy (TEM) method. Shown in FIGS. 12A(1)-12B(2) are TEM images of the catalyst treated at 500 C and 700° C. During the thermal treatment, cobalt will catalyze the polymeric moieties it coordinated with to convert them to the catalyst active site. Simultaneously, some of the cobalt ions will be reduced to metallic Co.

Example 10

Figure 13:
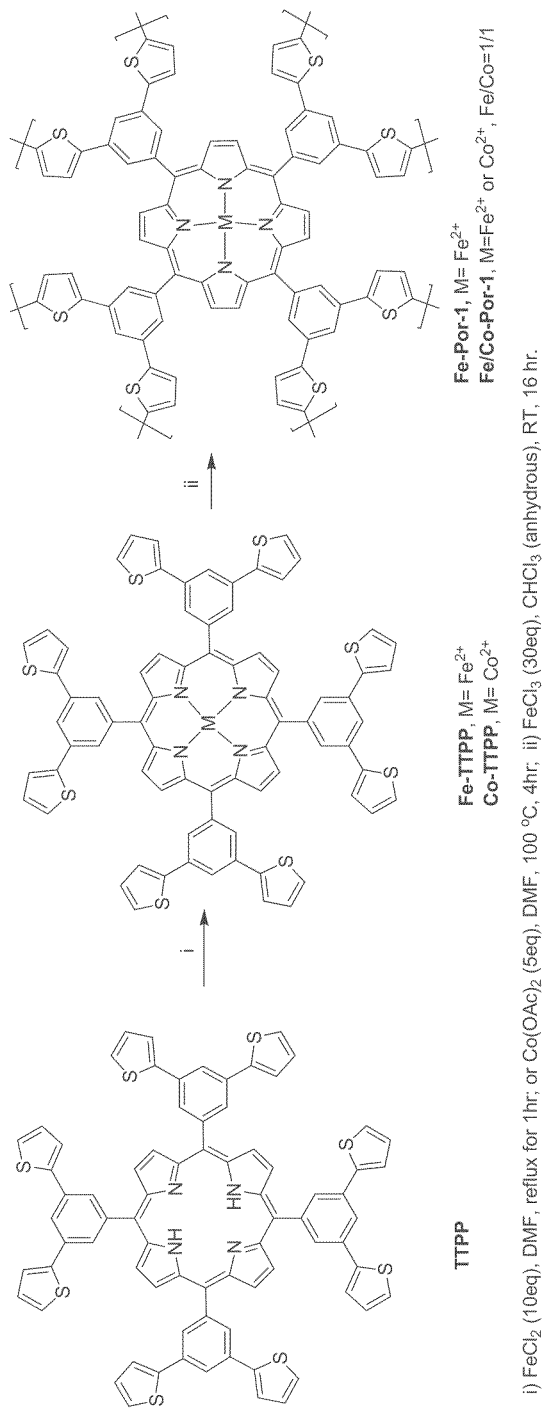
FIG. 13 shows a reaction scheme for synthesis of a porous polymer, Fe-Por-1, prepared according to Example 10.

Porous polymers Fe-Por-1 and Fe/Co-Por-1 were prepared according to reaction scheme depicted in FIG. 13. As shown in FIG. 13, these porous polymers contain porphyrin coordination sites for incorporating transition metals into the polymer. The porphyrin monomers were first doped with $Fe^{2+}$ or $Co^{2+}$. Then, the metal-containing porphyrin monomers were polymerized by an oxidative coupling polymerization reaction. If only Fe-doped porphyrin monomer was used in the polymerization, Fe-Por-1 was obtained; if a mixture of Fe-doped and Co-doped porphyrin monomers were used in the polymerization, Fe/Co-Por-1 was obtained. The synthesized polymers are highly porous materials with surface area in the range of 1200-1700 $m^2$/g. Elemental analysis of Fe-Por-1 showed that 2.1% of Fe by weight was retained in the polymer, corresponding to 50% of the porphyrin rings were still coordinated with Fe ions. Detailed descriptions of the procedure for synthesis of the porous polymers are provided below.

Fe(II)-5,10,15,20-Tetrakis(3,5-dithiophen-2-ylphenyl)-porphyrin (Fe-TTPP): Porphyrin TTPP (0.968 g, 0.726 mmol) was dissolved in 60 $cm^3$ DMF. $FeCl_2.4H_2O$ (1.45 g, 7.26 mmol) was added to this mixture and boiled for 1 hour. The reaction mixture was then cooled down to room temperature, diluted with $CH_2Cl_2$, and filtered. The filtered mixture was washed with brine and the organic phase was collected and dried over $NaSO_4$. After filtration, the solvent was removed to yield the Fe-TPPP. The Fe-TTPP was chromatographed on silica using a Hexane/$CH_2Cl_2$ (1:1) solvent mixture as the eluent and produced 0.62 g (64%) yield. Mass spectroscopy results obtained were: CI-MS: Calcd, 1325.5. found $(M+1)^+$, 1326.1. UV/vis ($\lambda_{max}$, nm $CH_2Cl_2 \times 10^5$ $cm^{-1}$ $M^{-1}$) 285.5 (1.16), 416.5 (1.20), 573.0 (0.121), 612.0 (0.07).

Co(II)-5,10,15,20-Tetrakis(3,5-dithiophen-2-ylphenyl)-porphyrin (Co-TTPP): Porphyrin TTPP (0.23 g, 0.172 mmol) was dissolved in 25 $cm^3$ DMF. $Co(OAc)_2.4H_2O$ (0.215 g, 0.86 mmol) was added to this mixture and heated at 100° C. for 4 hour. The reaction mixture was then cooled to room temperature, diluted with $CH_2Cl_2$, and filtered. The filtered mixture was washed with brine and the organic phase was collected and dried over $NaSO_4$. After filtration, the solvent was removed to yield Co-TTPP. The Co-TTPP was chromatographed on silica using a Hexane/$CH_2Cl_2$/ethyl acetate (6:3:1) solvent mixture as the eluent and produced 0.12 g (53%) yield. Mass spectroscopy results obtained were: Calcd, 1328.6. found ($M^+$) 1328.

Fe-Por-1: Anhydrous $FeCl_3$ (0.8 g, 5 mmol) was charged into a round-bottom flask. 10 ml of anhydrous $CHCl_3$ was added and stirred to make a suspension solution. Then a solution of Fe-TTPP (0.225 g, 0.17 mmol) in 20 ml of $CHCl_3$ was added dropwise at room temperature. The resulting mixture was stirred at room temperature for about 16 hours. 200 ml of MeOH was added to the above mixture and stirred for another hour. The precipitate was collected by filtration and washed with MeOH. The precipitate was stirred into 100 mL of $CHCl_3$ for 2 hours, and then filtered. The precipitate was dried in a vacuum oven at 90° C. overnight. The yield for Fe-Por-1 was about 100%.

Fe/Co-Por-1: Anhydrous $FeCl_3$ (0.8 g, 5 mmol) was charged into a round-bottom flask. 10 ml of anhydrous $CHCl_3$ was added and stirred to make a suspension solution. A solution of Fe-TTPP (0.11 g, 0.083 mmol) and Co-TTPP (0.11 g, 0.083 mmol) in 20 ml of $CHCl_3$ was added dropwise at room temperature. The resulting mixture was stirred at room temperature for about 16 hours. 200 ml of MeOH was added to the above mixture and stirred for another hour. The precipitate was collected by filtration and washed with MeOH. The precipitate was then stirred into 100 mL $CHCl_3$ for 2 hours, and filtered. The solid product was dried in a vacuum oven at 90° C. overnight. The yield for Fe/Co-Por-1 was about 100%.

Example 11

Figure 14:
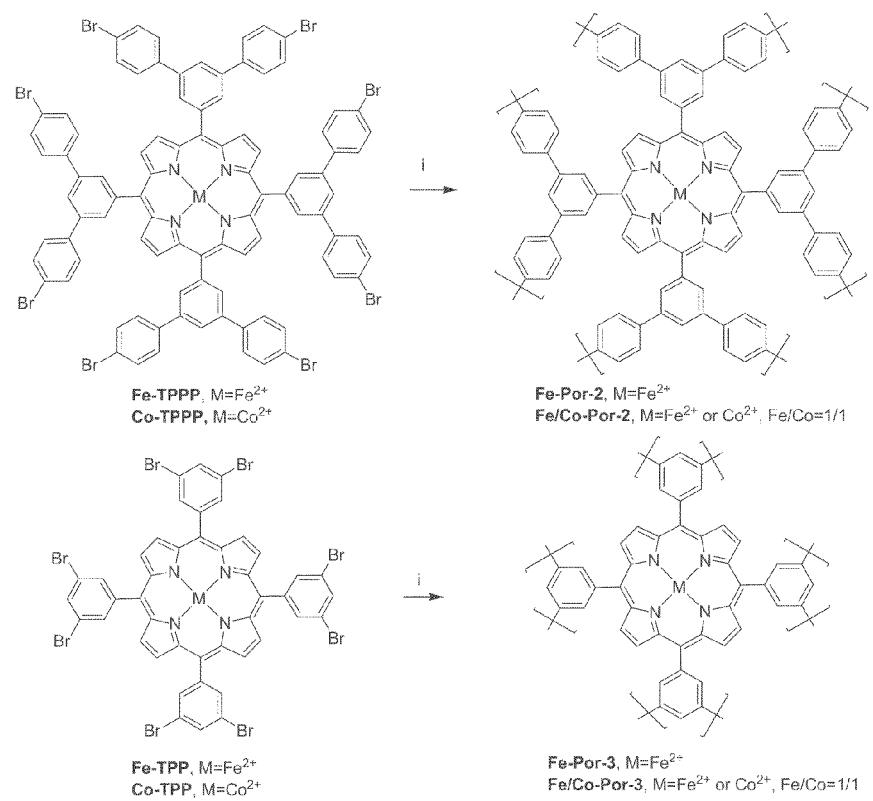
FIG. 14 shows reaction schemes for the synthesis of porous polymers, Fe-Por-2, Fe-Por-3, Fe/Co-Por-2, Fe/Co-Por-3 prepared according to Example 11.

Porous polymers Fe-Por-2, Fe/Co-Por-2, Fe-Por-3, and Fe/Co-Por-3 were prepared according to reaction schemes in FIG. 14. First, bromo-functionalized porphyrin monomers were doped with $Fe^{2+}$ or $Co^{2+}$. The bromo-functionalized porphyrin monomers are Fe-TPPP, Co-TPPP, Fe-TPP or Co-TPP. Then, the metal-containing porphyrin monomers were polymerized by an homocoupling reaction using nickel catalyst. The metal-doped bromo-functionalized porphyrin was prepared using the same procedure as described in Example 10. If only Fe-doped porphyrin monomers are polymerized, Fe-Por-2 and Fe-Por-3 is obtained; when a mixture of Fe-doped and Co-doped porphyrin monomers are polymerized, Fe/Co-Por-2 and Fe/Co-Por-3 is obtained. Detailed descriptions of the procedure for synthesis of the porous polymers are provided below.

Fe-Por-2: Fe-TPPP, bis(1,5-cyclooctadiene)nickel(0), bipyridine and 1,5-cyclooctadiene were charged into a round-bottom flask under argon, Anhydrous DMF was added via a syringe. The reaction mixture was then shielded from light and heated to 80° C. using a heating mantle for 3 days. After the reaction mixture was cooled to room temperature, dilute hydrochloric acid was added to decompose the nickel catalyst. The precipitate was collected by filtration and further washed sequentially with water, methanol, and $CHCl_3$. The product, Fe-Por-2 was dried in a vacuum oven at 90° C. overnight.

Fe/Co-Por-2: Equal molar solutions of Fe-TPPP and Co-TPPP, bis(1,5-cyclooctadiene)nickel(0), bipyridine and 1,5-cyclooctadiene were charged into a round-bottom flask under argon. Anhydrous DMF was added via a syringe. The reaction mixture was shielded from light and heated to 80° C. using a heating mantle for 3 days. After the reaction mixture was cooled to room temperature, dilute hydrochloric acid was added to decompose the nickel catalyst. The precipitate was then collected by filtration and further washed sequentially with water, methanol, and $CHCl_3$. The product, Fe/Co-Por-2 was dried in vacuum oven at 90° C. overnight.

Fe-Por-3: was prepared from Fe-TPP using the same procedure as used to prepare Fe-Por-2.

Fe/Co-Por-3: was prepared from equal molar solutions of Fe-TPP and Co-TPP using the same procedure as used to prepare Fe/Co-Por-2.

Example 12

Figure 15:
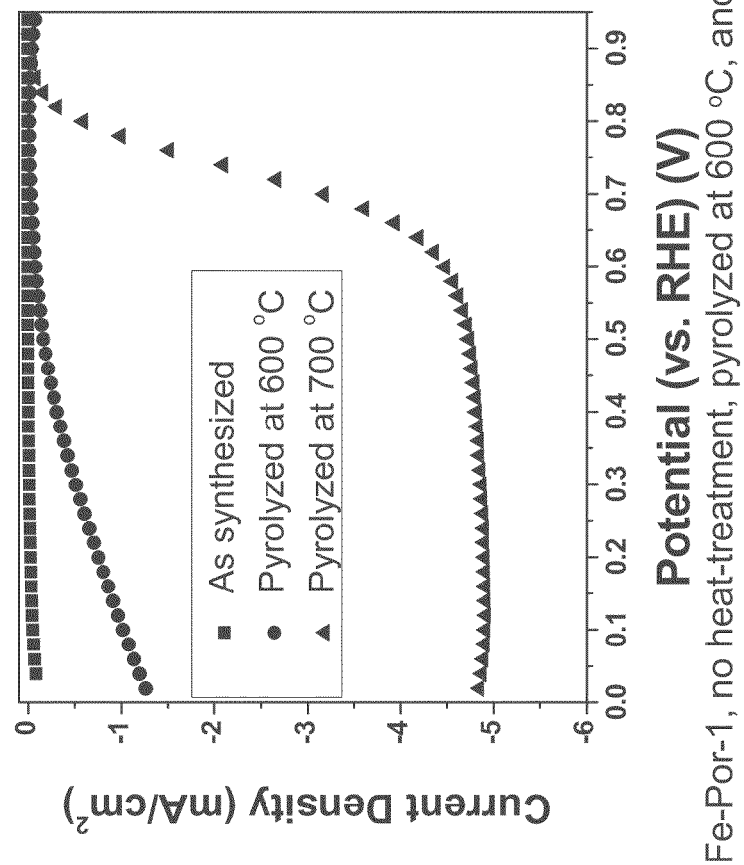
FIG. 15 shows polarization curves from a ring rotating disk electrode (RRDE) study of Fe-Por-1 without heat treatment, with heat treatment at 600° C. and 700° C. according to Example 12.

The porous polymer, Fe-Por-1, prepared according to Example 10 was heat treated at temperatures ranging between 600° C. and 1000° C. Fe-Por-1 is placed in a quartz reactor and heated to a set temperature under flowing nitrogen for 60 to 120 minutes Ink was prepared using Fe-Por-1 with and without heat treatment and cyclic voltammogram measurement were taken in argon and oxygen gases according to the procedure described in Example 2. FIG. 15 shows polarization curves from the ring rotating disk electrode (RRDE) of Fe-Por-1 without heat treatment (depicted by squares), Fe-Por-1 heat treated at 600° C. (depicted by circles) and at 700° C. (depicted by triangles). Here, the onset potential for Fe-Por-1 without heat treatment was not clearly observable; for Fe-Por-1 heat treated at 600° C. was about 0.68V; for Fe-Por-1 heat treated at 700° C. was about 0.91V.

Figure 16:
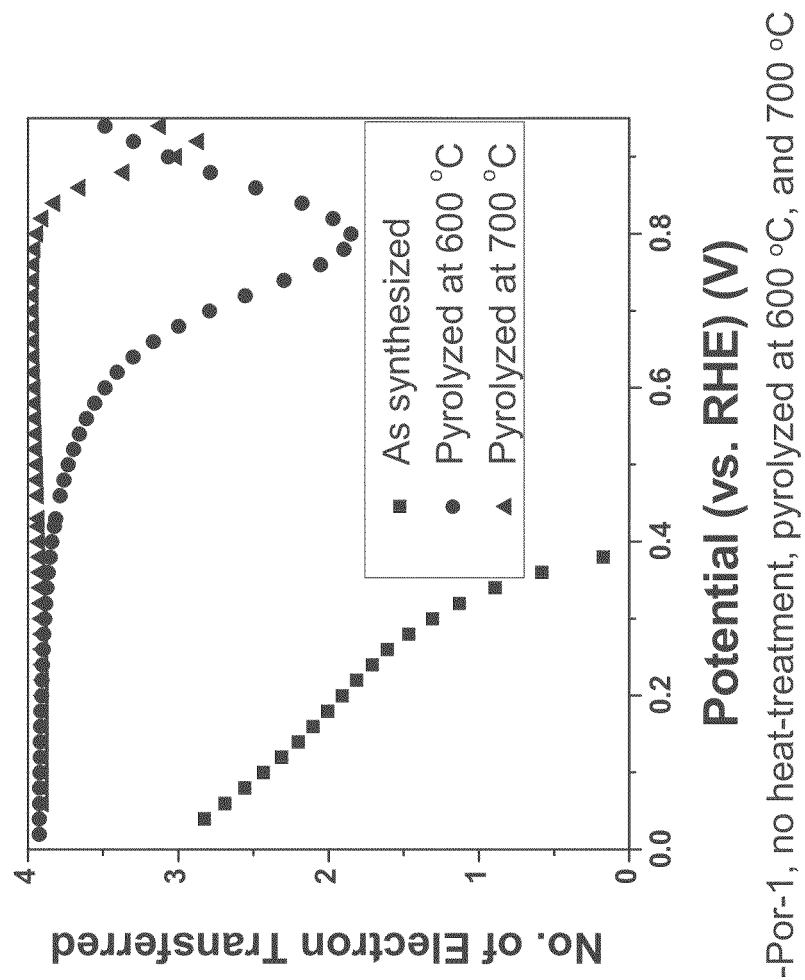
FIG. 16 shows the number of electron transferred as a function of polarization potential for Fe-Por-1 without heat treatment, with heat treatment at 600° C. and 700° C. according to Example 12.

Based on the RRDE curves for Fe-Por-1, the number of electrons at each potential can be determined according to Example 3. FIG. 16 shows the number of electron transferred as the function of electrode potential measured for Fe-Por-1 without heat treatment (depicted in squares) and with heat treatment at 600° C. (depicted in circles) and 700° C. (depicted in triangles). The sample treated at 700° C. has the electron transfer number of nearly 4 from 0 up to 0.8 volt, indicating a near complete conversion of oxygen to water during ORR reaction, which is preferred, in one embodiment, because it minimize undesirable peroxide formation.

Figure 17:
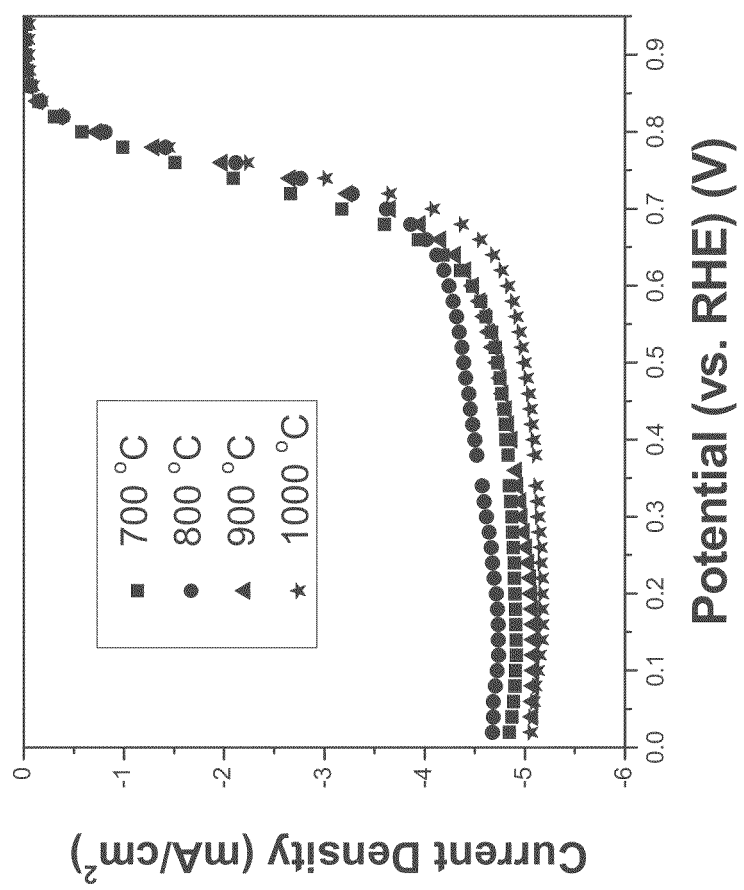
FIG. 17 shows RRDE results for Fe-Por-1 with heat treatment at 700° C., 800° C., 900° C. and 1000° C. according to Example 12.

Further studies confirmed the effect of heat treatment temperature of Fe-Por-1 on the on-set potential, which is a measure of ORR activity of the material. The higher onset potential is preferred since it can be made into cathode catalyst in PEMFC with lower over potential and high fuel cell efficiency. FIG. 17 shows the polarization curves for Fe-Por-1 heat treated at 700° C. (depicted by squares), 800° C. (depicted by circles), 900° C. (depicted by triangles) and 1000° C. (depicted by stars). As shown in FIG. 17, the onset potential increases as the heat treatment temperature increases from 600° C. to 700° C., and remains the same through up to 1000° C. The maximum onset potential obtained was 0.93 V vs. RHE. The Brunauer Emmett, Teller (BET) surface area of the Fe-Por-1 without heat treatment was measured to be around 1250 $m^2$/g. The surface area of the Fe-Por-1 decreased to 760 $m^2$/g after heat treatment at 700° C. indicating less than 40% loss of surface area as the result of conversion of organics to carbon during thermolysis. Such conversion is critical in improving electron conductivity to and from the active site. Over 60% retention of the surface area suggests that a majority of pores in polymer remains nearly unchanged.

Figure 18:
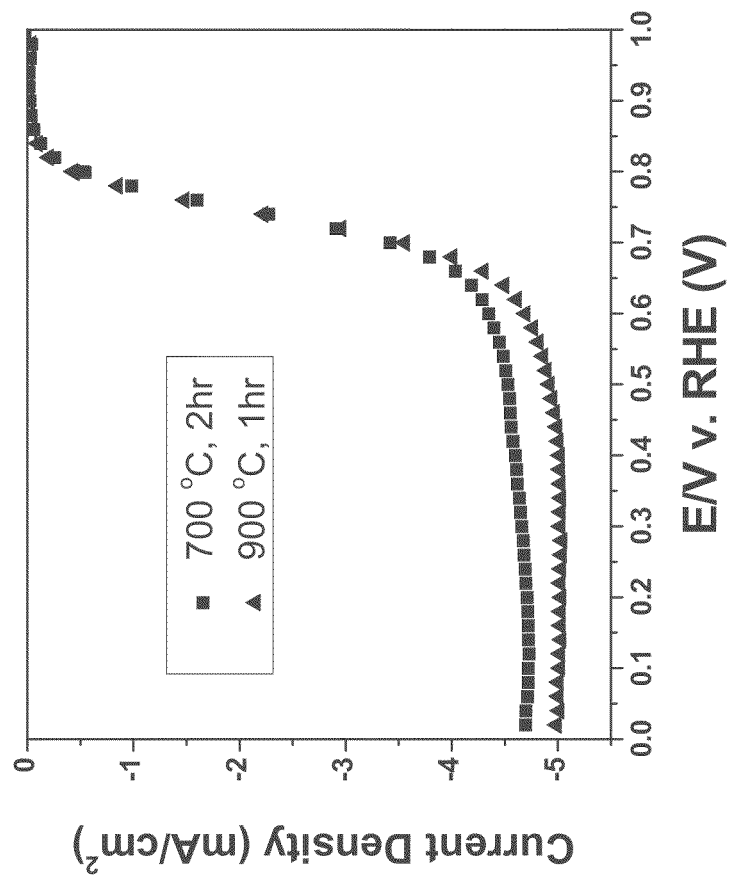
FIG. 18 shows RRDE results for Fe/Co-Por-1 after heat treatment at 700° C. and 900° C. according to Example 12.

The ORR activity of Fe/Co-Por-1 obtained according to Example 10 was heat treated at 700° C. and 900° C. was measured by RRDE curves shown in FIG. 18. An onset potential of around 0.91V vs. RHE was obtained for samples heated at these two temperatures.

Example 13

Figure 19:
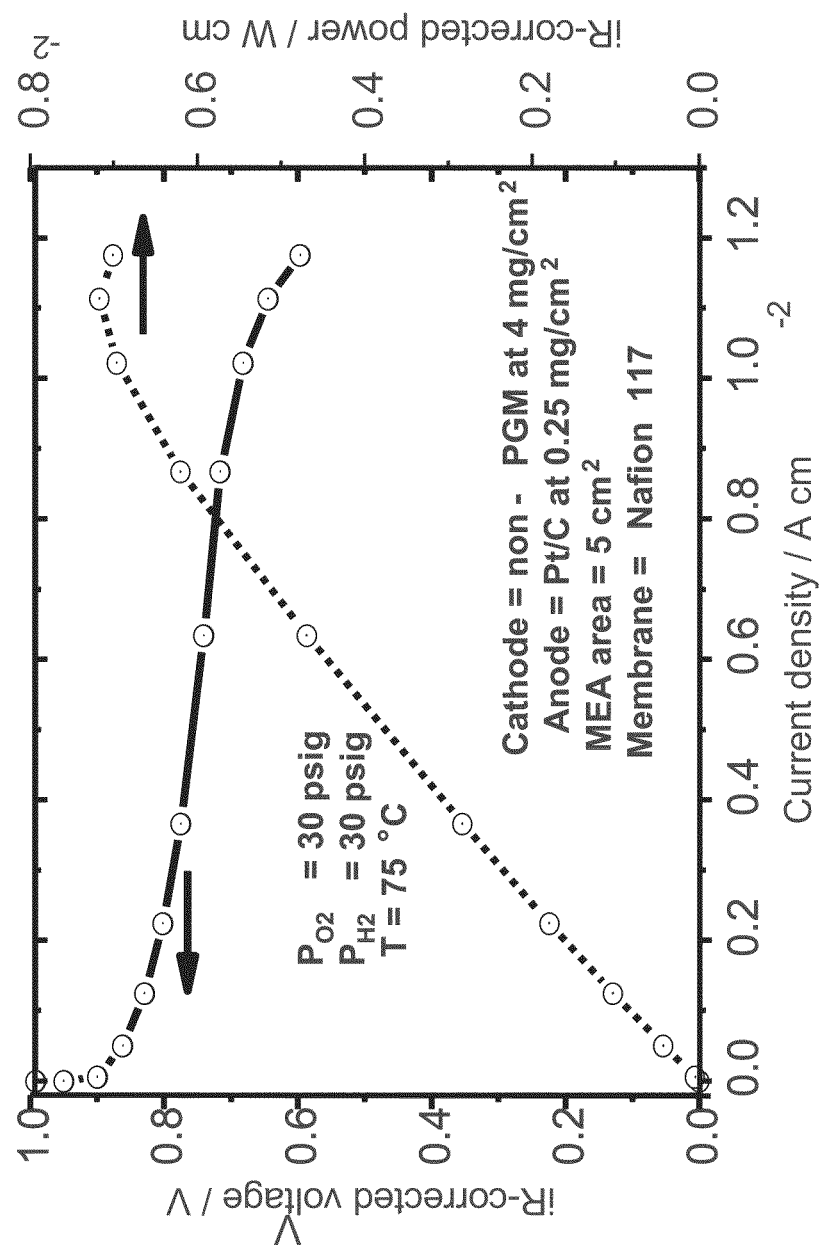
FIG. 19 shows the power density for a fuel cell containing a cathode catalyst of Fe-Por-1 after heat treatment at 1000° C. according to Example 13.

Fe-Por-1 was thermally treated at 1000° C. according to Example 12, and the resulting catalyst material was used as the cathode catalyst in a fuel cell. Commercial Pt/C was used as the anode catalyst. Loading of cathode catalyst was 4.0 mg/cm$^2$, and the loading of anode catalyst was 0.25 mg Pt/cm$^2$. The two electrodes were then hot pressed onto a Nafion membrane to get a membrane electrode assembly (MEA). A fuel cell was then prepared with the MEA. FIG. 19 shows the polarization curve and power density obtained with this fuel cell. The fuel cell has maximum power density of 0.7 W/cm$^2$, which is approaching the performance of MEA prepared with Pt/C as the cathode catalyst The subject invention described hereinbefore may exhibit numerous advantageous features, such as:
- High active site density—without the need for additional carbon support which could dilute site density. The site density is limited only by polymer design at molecular level therefore high number of active site can be achieved.
- Uniform catalytic site distribution—the catalytic sites are pre-built homogenously through cross-linking reaction without the in-homogeneity introduced by mixing support material, such as mixing carbon with polymer, as taught by the prior arts.
- High surface area and pore size control—narrow pore structure is homogenously distributed throughout the polymer which will lead to uniform porosity and surface property throughout the catalyst after thermal activation. Generally the surface areas are substantially enhanced after the thermal activation.
- Flexibility of precursor design—a wide variety of monomers and polymerization reactions can be used to rationally design the catalyst precursor for further enhancing the catalytic activity. This provides high level of flexibility that cannot be achieved in conventional catalysts.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of making an electrocatalyst comprising:
preparing a porous polymer by mixing a bipyridine monomer selected from:

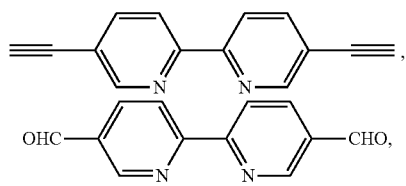

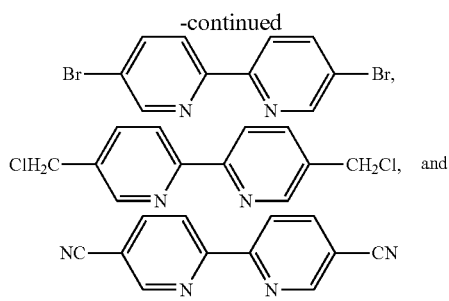

and a stereo-contorted spirobifluorene monomer selected from:

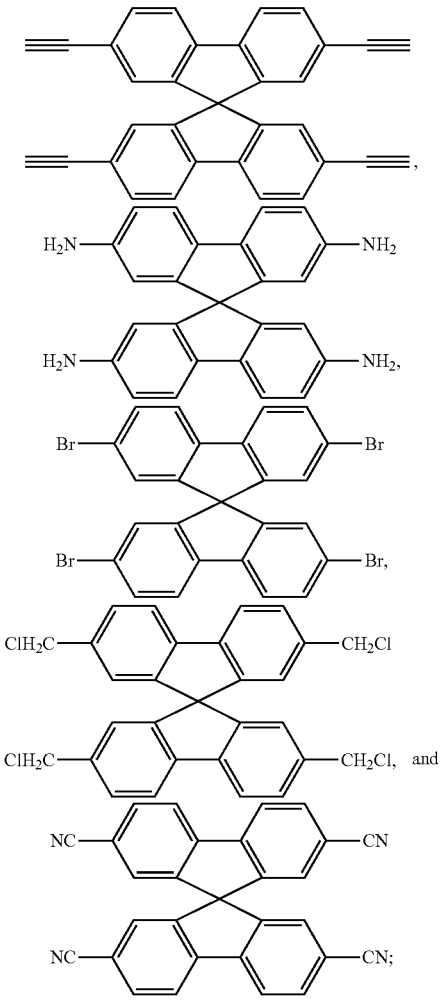

adding a precursor consisting essentially of one or more transition metals to the porous polymer; and
activating one or more transition metals disposed in the porous polymer by thermal treatment.

2. The method as defined in claim 1 wherein activating the transition metals includes calcining the porous polymer to form a carbonaceous material in an inert gas atmosphere.

3. The method as defined in claim 2 wherein the carbonaceous material is treated at an elevated temperature in the presence of N-containing compounds selected from ammonia, pyridine or acetonitrile.

4. The method as defined in claim 1 wherein the step of activating transition metal sites includes adding a metal complex selected from the group of $Co(hfac)_2$, $Fe(hfac)_2$ and $Ni(hfac)_2$ wherein hfac is hexafluoroacetylacetonate.

5. The method as defined in claim 1 which further includes post-treatment.

* * * * *